United States Patent
Wada et al.

(10) Patent No.: US 9,113,768 B2
(45) Date of Patent: Aug. 25, 2015

(54) CLEANING SHEET AND PROCESS FOR PRODUCING THE SAME

(75) Inventors: Minoru Wada, Tochigi (JP); Hiroshi Otsuka, Tochigi (JP)

(73) Assignee: KAO CORPORATION, Tokyo (JP)

( * ) Notice: Subject to any disclaimer, the term of this patent is extended or adjusted under 35 U.S.C. 154(b) by 892 days.

(21) Appl. No.: 12/988,224

(22) PCT Filed: Apr. 9, 2009

(86) PCT No.: PCT/JP2009/057248
§ 371 (c)(1),
(2), (4) Date: Dec. 16, 2010

(87) PCT Pub. No.: WO2009/128381
PCT Pub. Date: Oct. 22, 2009

(65) Prior Publication Data
US 2011/0088189 A1    Apr. 21, 2011

(30) Foreign Application Priority Data

Apr. 16, 2008  (JP) ................. 2008-106357
Jun. 10, 2008  (JP) ................. 2008-152015

(51) Int. Cl.
*A47L 13/38* (2006.01)
*B32B 5/26* (2006.01)
(Continued)

(52) U.S. Cl.
CPC ............. *A47L 13/20* (2013.01); *A47L 13/38* (2013.01); *B32B 5/08* (2013.01); *B32B 5/26* (2013.01);
(Continued)

(58) Field of Classification Search
CPC ......... A47L 13/00; A47L 13/16; A47L 13/20; A47L 13/38; A47L 13/40; A47L 13/46; B32B 5/22; B32B 5/24; B32B 5/26

USPC ............ 15/209.1, 208, 210.1, 226, 228; 156/250; 442/366
See application file for complete search history.

(56) References Cited

U.S. PATENT DOCUMENTS 6,143,393 A   11/2000  Abe et al.
6,241,835 B1   6/2001  Abe et al.
(Continued)

FOREIGN PATENT DOCUMENTS

CA   2 561 362 A1   7/2006
CN   1921793 A      2/2007
(Continued)

OTHER PUBLICATIONS

Notice and Submission of Information for corresponding Japanese Patent Application No. 2008-106357, mailed Sep. 4, 2012.
(Continued)

*Primary Examiner* — Cheryl Juska
(74) *Attorney, Agent, or Firm* — Birch, Stewart, Kolasch & Birch, LLP

(57) ABSTRACT

A cleaning sheet (1A) of the invention includes: a substrate sheet (2); and at least one long-fiber bundle (3) disposed on at least one side of the substrate sheet (2) and made by aggregating long fibers (31) oriented in substantially one direction. The long-fiber bundle (3) is formed by joining the long fibers (31) together with a fiber-joining section (32) extending linearly in a direction orthogonal to the orientation direction of the long fibers (31). The cleaning sheet (1A) is formed by joining the thus-formed long-fiber bundle (3) to the substrate sheet (2) by at least one sheet-joining section (21). The cleaning sheet (1A) is formed such that the entire fiber-joining section (32) or at least a portion of the fiber-joining section (32) is not joined to the substrate sheet (2) and the sheet-joining section (21) is in perpendicular contact with the fiber-joining section (32).

5 Claims, 9 Drawing Sheets

(51) Int. Cl.

| | | |
|---|---|---|
| *B32B 38/04* | (2006.01) | |
| *A47L 13/20* | (2006.01) | |
| *B32B 5/08* | (2006.01) | |
| *D04H 3/04* | (2012.01) | |
| *D04H 3/14* | (2012.01) | |
| *D04H 11/00* | (2006.01) | |
| *A47L 13/40* | (2006.01) | |
| *B29C 65/08* | (2006.01) | |
| *B29C 65/18* | (2006.01) | |
| *B29C 65/00* | (2006.01) | |
| *B29L 31/00* | (2006.01) | |

(52) U.S. Cl.
CPC . *D04H 3/04* (2013.01); *D04H 3/14* (2013.01); *D04H 11/00* (2013.01); *A47L 13/40* (2013.01); *B29C 65/086* (2013.01); *B29C 65/18* (2013.01); *B29C 66/21* (2013.01); *B29C 66/232* (2013.01); *B29C 66/69* (2013.01); *B29C 66/71* (2013.01); *B29C 66/7294* (2013.01); *B29C 2793/009* (2013.01); *B29L 2031/7406* (2013.01); *Y10T 156/1052* (2015.01)

(56) References Cited

U.S. PATENT DOCUMENTS

| | | |
|---|---|---|
| 6,245,413 B1 | 6/2001 | Kenmochi et al. |
| 6,329,308 B1 | 12/2001 | Kenmochi et al. |
| 6,813,801 B2 | 11/2004 | Tanaka et al. |
| 6,830,801 B1 | 12/2004 | Kenmochi et al. |
| 7,237,296 B2* | 7/2007 | Tanaka et al. ............... 15/229.3 |
| 7,334,287 B2 | 2/2008 | Tanaka et al. |
| 7,566,671 B2* | 7/2009 | Hoadley et al. ............... 442/381 |
| 7,640,618 B2* | 1/2010 | Tanaka et al. ............... 15/229.3 |
| 7,937,797 B2* | 5/2011 | Tsuchiya et al. ............ 15/229.3 |
| 8,146,197 B2 | 4/2012 | Yamada |
| 8,151,402 B2* | 4/2012 | Takabayashi et al. ........ 15/229.3 |
| 8,151,403 B2* | 4/2012 | Wada et al. .................... 15/229.4 |
| 8,245,349 B2* | 8/2012 | Tsuchiya et al. ............ 15/229.3 |
| 8,359,699 B2* | 1/2013 | Tanaka .......................... 15/229.3 |
| 8,621,704 B2* | 1/2014 | Tsuchiya et al. ............ 15/229.3 |
| 8,646,144 B2* | 2/2014 | Wada et al. ...................... 15/208 |
| 2004/0016074 A1* | 1/2004 | Tanaka .............................. 15/228 |
| 2005/0092421 A1 | 5/2005 | Kenmochi et al. |
| 2006/0185108 A1 | 8/2006 | Hoadley et al. |
| 2007/0050934 A1 | 3/2007 | Yamada |
| 2007/0190878 A1 | 8/2007 | Willman et al. |
| 2008/0148508 A1* | 6/2008 | Yamada ....................... 15/229.3 |
| 2009/0165230 A1* | 7/2009 | Tsuchiya et al. ................ 15/114 |
| 2010/0015383 A1 | 1/2010 | Yamada |
| 2010/0088837 A1 | 4/2010 | Wada et al. |
| 2010/0229317 A1* | 9/2010 | Tsuchiya et al. ............. 15/209.1 |
| 2011/0119852 A1* | 5/2011 | Tanaka et al. ............... 15/209.1 |
| 2011/0277258 A1* | 11/2011 | Otsuka et al. ............... 15/209.1 |
| 2012/0117744 A1* | 5/2012 | Tanaka et al. .................. 15/231 |
| 2013/0031738 A1* | 2/2013 | Fukuzawa et al. ............... 15/231 |
| 2014/0075701 A1* | 3/2014 | Tsuchiya et al. ............. 15/209.1 |
| 2014/0082872 A1* | 3/2014 | Tsuchiya et al. ................ 15/231 |

FOREIGN PATENT DOCUMENTS

| | | |
|---|---|---|
| EP | 0 777 997 A2 | 6/1997 |
| EP | 0943425 A1 | 9/1999 |
| EP | 1 212 972 A2 | 6/2002 |
| EP | 1 731 076 A1 | 12/2006 |
| JP | 10-5163 A | 1/1998 |
| JP | 11-235301 A | 8/1999 |
| JP | 2000-93373 A | 4/2000 |
| JP | 2000-245670 A | 9/2000 |
| JP | 2000-296084 A | 10/2000 |
| JP | 3107183 U | 1/2005 |
| JP | 2005-40641 A | 2/2005 |
| JP | 2005-131422 A | 5/2005 |
| JP | 3668630 B2 | 7/2005 |
| JP | 2006-230536 A | 9/2006 |
| JP | 2007-42270 A | 2/2007 |
| JP | 2007-289341 A | 11/2007 |
| JP | D1317543 | 12/2007 |
| JP | 2008-289867 A | 12/2008 |
| JP | 2009-6134 A | 1/2009 |
| JP | 2009-153910 A | 7/2009 |
| WO | WO 03/049589 A1 | 6/2003 |
| WO | WO 2005/099549 A1 | 10/2005 |
| WO | WO 2006/070502 A1 | 7/2006 |
| WO | WO 2008/099733 A1 | 8/2008 |
| WO | WO 2010/092895 A1 | 8/2010 |

OTHER PUBLICATIONS

Notice of Rejection for corresponding Japanese Patent Application No. 2008-152015, mailed Sep. 4, 2012.
Extended European Search Report issued on Nov. 8, 2010 in corresponding European Patent Application No. 08752134.0.
International Preliminary Report on Patentability for Application No. PCT/JP2008/058100, dated Dec. 3, 2009.
International Preliminary Report on Patentability for Application No. PCT/JP2009/057248, dated Nov. 30, 2010.
International Search Report dated Jul. 28, 2010 for PCT/JP2009/057248.
Chinese Office Action, dated Jun. 26, 2012, for Chinese Application No. 200980113391.5 and English translation.
International Search Report, PCT/JP2008/058100, Jul. 22, 2008.
International Search Report, PCT/JP2010/051573, Mar. 9, 2010.
International Preliminary Report on Patentability and Written Opinion of the International Searching Authority (Forms PCT/IB/373, PCT/IB/338 and PCT/ISA/237),dated Sep. 22, 2011, for International Application PCT/JP2010/051573.
United States Office Action, dated Nov. 15, 2013, for U.S. Appl. No. 13/144,252.
Canadian Examination Search Report (dated Sep. 23, 2014), mailed on Feb. 2, 2015, for Canadian Application No. 2,721,340.

* cited by examiner

CLEANING SHEET AND PROCESS FOR PRODUCING THE SAME

TECHNICAL FIELD

The present invention relates to a cleaning sheet having a multitude of long fibers oriented in substantially one direction.

BACKGROUND ART

There are known cleaning sheets that are used by being attached to a head of a cleaning tool which further includes a handle connected to the head. Some types of these cleaning sheets are known to have a multitude of long fibers.

For example, Patent Literature 1 discloses a cleaning sheet having a heat-fusible sheet and a multitude of heat-fusible long fibers extending in one direction and joined to the heat-fusible sheet by a plurality of melt-bonding sections that extend continuously in a direction intersecting the long fibers and that are disposed intermittently in the direction in which the heat-fusible long fibers extend.

In the cleaning sheet of Patent Literature 1, however, the heat-fusible long fibers are joined to the heat-fusible sheet by the continuously-extending melt-bonding sections. Such a structure limits the degree of freedom of the heat-fusible long fibers between adjacent melt-bonding sections, whereby it is difficult to improve the dirt trapping capabilities. Further, the heat-fusible long fibers may get caught in objects-being-cleaned.

In order to increase the degree of freedom of heat-fusible long fibers, Patent Literature 2 discloses a method for making a cleaning sheet including a step of cutting the multitude of heat-fusible long fibers between adjacent melt-bonding sections to divide the length of the heat-fusible long fiber into two halves.

However, in the cleaning sheet made by the method disclosed in Patent Literature 2, the heat-fusible long fibers are joined to the heat-fusible sheet only by the continuously-extending melt-bonding sections and are thus integrated with the sheet. Therefore, the heat-fusible long fibers cannot move freely in the form of an aggregated bundle of long fibers, whereby it is difficult to improve the dirt trapping capabilities.

Meanwhile, Patent Literature 3 also discloses a cleaning sheet including a multitude of heat-fusible long fibers having different lengths by cutting the heat-fusible long fibers between adjacent continuously-extending melt-bonding sections, in order to increase the degree of freedom of heat-fusible long fibers.

In the cleaning sheet of Patent Literature 3, however, the heat-fusible long fibers are cut by an intermittent cutting line arranged between adjacent continuously-extending melt-bonding sections in the same direction as the continuously-extending melt-bonding sections, and therefore, not all of the heat-fusible long fibers between the adjacent melt-bonding sections are completely cut apart. Such a structure limits the degree of freedom of the heat-fusible long fibers between the adjacent continuously-extending melt-bonding sections. Further, in this Patent Literature, the length of the thus-cut heat-fusible long fibers possessed by one of the adjacent continuously-extending melt-bonding sections differs from the length of the long fibers possessed by the other melt-bonding section. However, the length of all the heat-fusible long fibers possessed by either the one or the other melt-bonding section is uniform. Thus there is no randomness in the lengths of the heat-fusible long fibers, whereby it is difficult to improve the dirt trapping capabilities.

Patent Literature 1: U.S. Pat. No. 6,329,308 B1
Patent Literature 2: EP 0777997 A2
Patent Literature 3: JP-A-2000-245670

DISCLOSURE OF INVENTION

Accordingly, the present invention relates to providing a cleaning sheet and a process for producing the same, in which the degree of freedom of long-fiber bundles is not limited by the joining sections that join the heat-fusible long fibers to the heat-fusible sheet and thus the degree of freedom of the heat-fusible long fibers is increased and dirt trapping capabilities are improved.

The present invention also relates to a cleaning sheet in which the degree of freedom of the heat-fusible long fibers is not limited by the joining sections that join the heat-fusible long fibers to the heat-fusible sheet and thus the heat-fusible long fibers are less prone to get caught in objects-being-cleaned. Further, the present invention relates to a cleaning sheet in which the lengths of the heat-fusible long fibers from the melt-bonding section to their tip ends are made random and thus the dirt trapping capabilities are improved.

The present invention relates to a cleaning sheet including: a substrate sheet; and at least one long-fiber bundle disposed on at least one side of the substrate sheet and made by aggregating long fibers oriented in substantially one direction.

The long-fiber bundle is formed by joining the long fibers together with a fiber-joining section extending linearly in a direction orthogonal to the orientation direction of the long fibers.

The cleaning sheet is formed by joining the long-fiber bundle to the substrate sheet by at least one sheet-joining section.

The cleaning sheet is formed such that the entire fiber-joining section or at least a portion of the fiber-joining section is not joined to the substrate sheet and the sheet-joining section is in perpendicular contact with the fiber-joining section.

The present invention relates to a process for producing a cleaning sheet, including at least: a long-fiber bundle forming step of winding off an aggregate of long fibers oriented in one direction, widening the aggregate to a predetermined width, and joining the long fibers together with a fiber-joining section extending in a direction intersecting the orientation direction of the long fibers, to form a single-piece long-fiber bundle; a long-fiber bundle supplying step of supplying the long-fiber bundle in the same direction as the orientation direction of the long fibers onto at least one side of a continuous belt-like substrate sheet; a laminated structure forming step of joining the long-fiber bundle and the belt-like substrate sheet by at least one sheet-joining section, to form a laminated structure; and a cleaning sheet forming step of cutting the laminated structure into a predetermined length, to form individual cleaning sheets.

The present invention relates to a cleaning sheet including: a substrate sheet; and a long-fiber bundle joined to at least one side of the substrate sheet and made by joining, into a fiber bundle, a multitude of long fibers oriented in substantially one direction with a plurality of fiber-joining sections extending linearly in a direction intersecting the orientation direction of the long fibers.

The plurality of fiber-joining sections are disposed with a predetermined spacing therebetween. The multitude of long fibers are cut between adjacent ones of the fiber-joining sections by a plurality of linear cut sections.

In the cleaning sheet, the linear cut sections and non-cut sections are disposed alternately to form a discontinuous line, and two of these discontinuous lines are formed parallel to one another between the adjacent fiber-joining sections.

The two discontinuous lines of the cleaning sheet look continuous when viewed from the orientation direction of the long fibers.

DETAILED DESCRIPTION OF THE INVENTION

Figure 1:
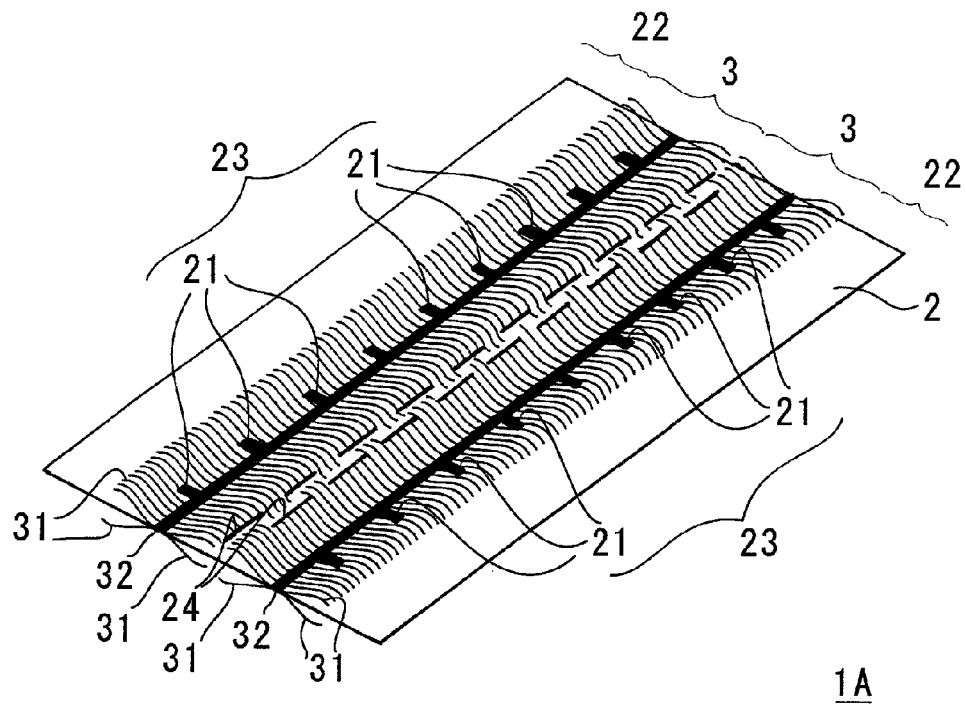
FIG. 1 is a perspective of a cleaning sheet according to a first embodiment of the present invention.

A preferred embodiment of a cleaning sheet of the present invention will be described below with reference to FIGS. 1 to 5.

As illustrated in FIGS. 1 to 5, a cleaning sheet 1A of the first embodiment includes at least one long-fiber bundle 3 disposed on at least one side of a substrate sheet 2 and made by aggregating long fibers 31 oriented in substantially one direction. The long-fiber bundle 3 is formed by joining the long fibers 31 together with a fiber-joining section 32 extending linearly in a direction intersecting the orientation direction of the long fibers 31. In the cleaning sheet 1A, the thus-formed long-fiber bundle 3 is joined to the substrate sheet 2 by sheet-joining sections 21, and at least a portion of the fiber-joining section 32 is not joined to the substrate sheet 2.

The plurality of the sheet-joining sections 21 in the cleaning sheet 1A are disposed intermittently in a direction intersecting the orientation direction of the long fibers 31.

The cleaning sheet 1A of the first embodiment will be described in detail.

The cleaning sheet 1A has, per side, preferably 2 to 30 long-fiber bundles 3 on one or both sides of the substrate sheet 2.

Below, a cleaning sheet 1A having, per side, two long-fiber bundles 3 on both sides of the substrate sheet 2 will be described in detail with reference to the drawings.

Figure 2:
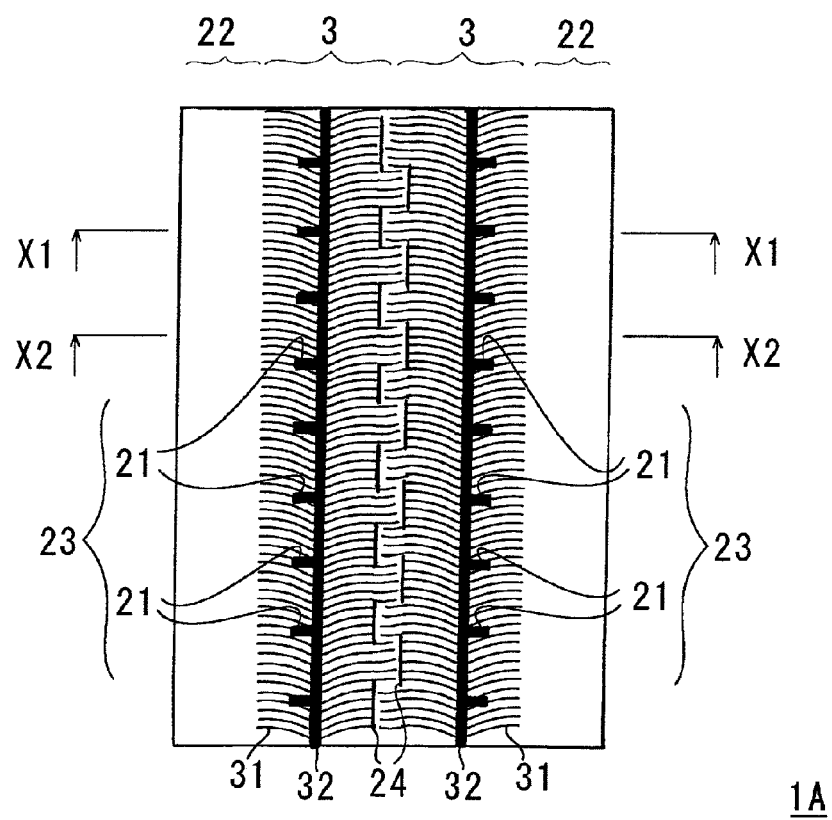
FIG. 2 is a plan view of the cleaning sheet of FIG. 1.

As illustrated in FIGS. 1 and 2, the substrate sheet 2 is rectangular. The length of the substrate sheet 2 is 10 cm to 60 cm, and the width of the substrate sheet 2 is 5 cm to 40 cm. In the cleaning sheet 1A, the long-fiber bundles 3 are disposed on both sides of the substrate sheet 2 by sheet-joining sections 21.

Generally, the long fibers 31 that constitute the long-fiber bundle 3 are oriented in a direction in which the material therefor is carried during production.

Herein, the expression "the long fibers 31 are oriented in substantially one direction" does not intend to exclude instances where the orientation direction of some of the long fibers 31 deviates from the orientation direction of the rest of the majority of the long fibers 31 due to manufacturing error, crimping of the long fibers 31, and so forth.

Figure 3:
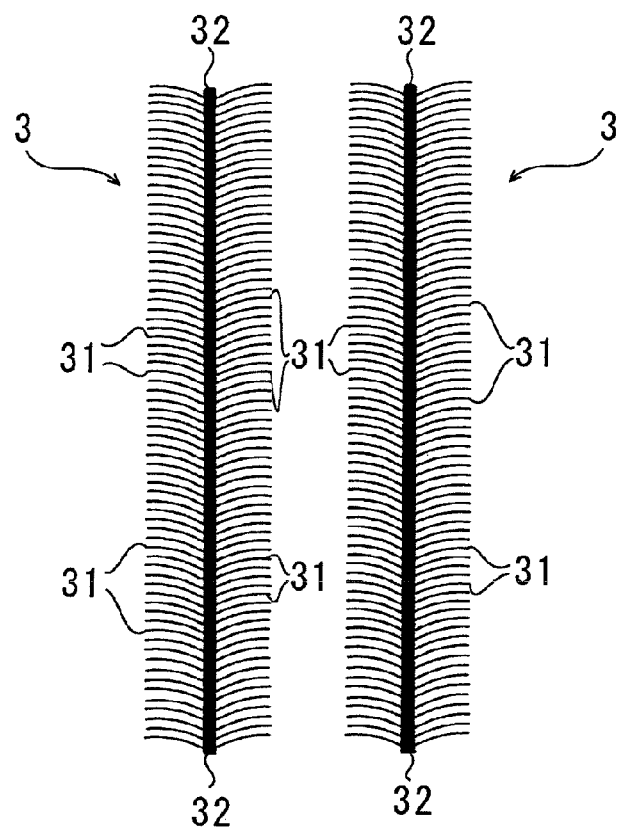
FIG. 3 is a plan view illustrating the shape of long-fiber bundles in the cleaning sheet of FIG. 1.

As illustrated in FIG. 3, in the cleaning sheet 1A of the first embodiment, each long-fiber bundle 3 is formed by joining the multitude of long fibers 31 together with a single fiber-joining section 32 extending continuously in a direction orthogonal to the orientation direction of the long fibers 31. The long-fiber bundle 3 is rectangular as viewed macroscopically, as illustrated in FIG. 3.

As illustrated in FIGS. 1 and 2, in the cleaning sheet 1A of the first embodiment, the long-fiber bundles 3 are disposed on both sides of the substrate sheet 2 such that the length direction of each long-fiber bundle 3 matches the length direction of the substrate sheet 2. Further, as illustrated in FIGS. 1 and 2, in the cleaning sheet 1A of the first embodiment, two long-fiber bundles 3 are disposed side-by-side in the width direction of the substrate sheet 2 without substantially leaving a space therebetween. The length of each long-fiber bundle 3 is the same as the length of the substrate sheet 2, and the width of each long-fiber bundle 3 is 2 cm to 30 cm. In the present embodiment, the width of the substrate sheet 2 is larger than the total width of the two long-fiber bundles 3, and the regions of the substrate sheet 2 located outward widthwise of the long-fiber bundles 3 (which are referred to hereinafter as "flaps 22") becomes sections that are used to attach the cleaning sheet to a head of a cleaning tool (described in detail further below).

In each long-fiber bundle 3, it is preferable to provide 1,000 to 50,000 pieces, and more preferably 5,000 to 40,000 pieces, of long fibers 31 per centimeter of the fiber-joining section 32 on one side thereof from the standpoint of dust trapping capabilities.

The length of the long fiber 31 is preferably 5 to 150 mm, and more preferably 10 to 120 mm, in view of dust trapping capabilities. The "length of the long fiber 31" refers to the length from the fiber-joining section 32 to the tip end of each long fiber 31. In the present embodiment, long fibers 31 having such lengths are used in the form of a fiber aggregate (tow). It is preferable to sufficiently open the fiber aggregate (tow) with a known opening device beforehand. While the thickness of the long fibers 31 is not particularly critical, the thickness is preferably 0.1 to 200 dtex, and more preferably 2 to 30 dtex, from the standpoint of securing dust trapping capabilities and preventing scratches on the surface of an object-being-cleaned.

It is also preferable to use crimped fibers as the long fibers 31 because the dust trapping capabilities can be further improved.

Also, colors other than white (such as orange or light blue) may be used for the long fibers 31 in order, for example, to improve the product appearance and visibility of any soil attached.

The fiber-joining section 32 is for forming the long-fiber bundle 3. In the present embodiment, at least a portion of the fiber-joining section 32 is not joined to the substrate sheet 2. The fiber-joining section 32 is formed by heat-fusing or with a hot-melt adhesive, and in the present embodiment, it is formed by heat-fusing the long fibers 31. As illustrated in FIGS. 1 to 3, the fiber-joining section 32 is formed as a single continuous straight line extending in a direction orthogonal to the orientation direction of the long fibers 31, i.e., in the length direction of the substrate sheet 2. As illustrated in FIGS. 1 to 3, the length of the fiber-joining section 32 is the same as the length of the substrate sheet 2. The width of the fiber-joining section 32 as illustrated in FIGS. 1 to 3 is 0.5 mm to 10 mm.

The sheet-joining sections 21 are for joining the long-fiber bundle(s) 3 to the substrate sheet 2, and are formed by heat-fusing or with a hot-melt adhesive; in the present embodiment, they are formed by heat-fusing the long fibers 31 to the substrate sheet 2. As illustrated in FIGS. 1 and 2, in the present embodiment, a plurality of the sheet-joining sections 21 are disposed intermittently with adjacent sheet-joining sections 21 on a straight line in a direction orthogonal to the orientation direction of the long fibers 31—i.e., in the length direction of the substrate sheet 2—to form a sheet-joining section group 23 as a whole. The adjacent sheet-joining sections 21 are disposed at substantially equal intervals.

As illustrated in FIGS. 1 and 2, the interval between one sheet-joining section 21 and an adjacent sheet-joining section 21 is preferably 10 mm to 45 mm, and more preferably 15 mm to 40 mm. An interval of less than 10 mm between adjacent sheet-joining sections 21 makes the degree of freedom of the long-fiber bundle too low, whereas an interval of over 45 mm makes the degree of freedom of the long-fiber bundle too high.

Further, as illustrated in FIGS. 1 and 2, each sheet-joining section 21 is made long in the orientation direction of the long fibers 31. The length of each sheet-joining section 21 as illustrated in FIGS. 1 and 2 is 2 mm to 50 mm, and the width of each sheet-joining section 21 as illustrated in FIGS. 1 and 2 is 0.5 mm to 10 mm.

Figure 4:
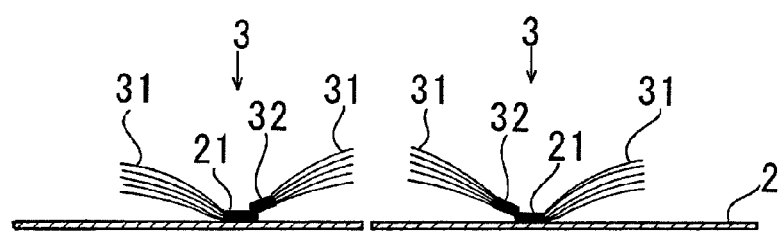
FIG. 4 is a partial cross-sectional view of the cleaning sheet of FIG. 2 taken along line X1-X1.
Figure 5:
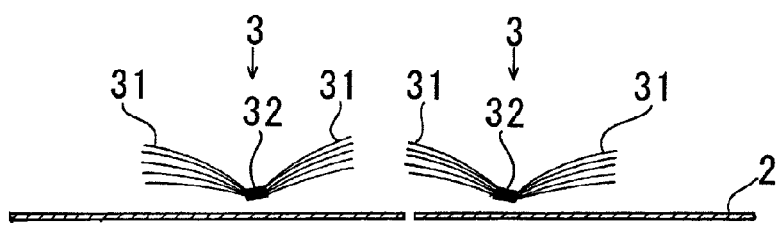
FIG. 5 is a partial cross-sectional view of the cleaning sheet of FIG. 2 taken along line X2-X2.

In the present embodiment, the fiber-joining section 32 is joined with the sheet-joining sections 21 as illustrated in FIG. 4, but at least a portion of the fiber-joining section 32 is not joined to the substrate sheet 2 as illustrated in FIGS. 4 and 5. As illustrated in FIGS. 1 and 2, the sheet-joining sections 21 are disposed on the fiber-joining section 32, and thus the sheet-joining sections 21 are in contact with the fiber-joining section 32. More specifically, as illustrated in FIGS. 1 and 2, each sheet-joining section 21 is in perpendicular contact with the fiber-joining section 32, and joins the long-fiber bundle 3 to the substrate sheet 2, as illustrated in FIG. 4. Further, as illustrated in FIG. 5, the long-fiber bundle 3 and the substrate sheet 2 are not joined together between adjacent sheet-joining sections 21, 21, and thus, the long-fiber bundle 3 is separate from the substrate sheet 2. In other words, of the entire fiber-joining section 32, only portions in contact with the sheet-joining sections 21 are joined to the substrate sheet 2, and the other portions (portions of the fiber-joining section 32 not in contact with the sheet-joining sections 21) are not joined to the substrate sheet 2, and in those portions, the long-fiber bundle 3 is separate from the substrate sheet 2.

As illustrated in FIGS. 1 and 2, the cleaning sheet 1A of the first embodiment has two sheet-joining section groups 23, 23, and the substrate sheet 2 is cut between the sheet-joining section groups 23, 23 by a plurality of linear cut sections 24. As illustrated in FIGS. 1 and 2, the linear cut sections 24 are formed in the length direction of the substrate sheet 2 as two parallel discontinuous lines with alternately-disposed discontinuous sections—i.e., the linear cut sections 24 are disposed in a staggered pattern.

Next, the materials for forming the cleaning sheet 1A of the first embodiment will be described.

The substrate sheet 2 is flexible in its length direction, and thus easily conforms to the contour of an object-being-cleaned. Accordingly, the long-fiber bundles 3 joined to the substrate sheet 2 are conformable to the contour of an object-being-cleaned, providing the cleaning sheet 1A with an excellent dirt-and-dust trapping effect.

Fibrous sheets such as nonwoven fabrics used for conventional cleaning sheets may be used for the substrate sheet 2. Air-through nonwoven fabrics or spun-bonded nonwoven fabrics are particularly preferable. Further, other nonwoven fabrics, netted sheets, films, synthetic paper, or composite materials made thereof may be used as the material for forming the substrate sheet 2.

The long fibers 31 may be made using such materials as heat-fusible synthetic fibers, conjugate fibers, or crimped fibers produced by heat-treating the above. The long fibers 31 may undergo such treatments as oil-solution impregnation, anti-static treatment, electrical-charging treatment, and hydrophilizing treatment, as necessary.

The actions and effects of the above-described cleaning sheet 1A of the first embodiment of the present invention, when in use, will be described below.

Figure 6:
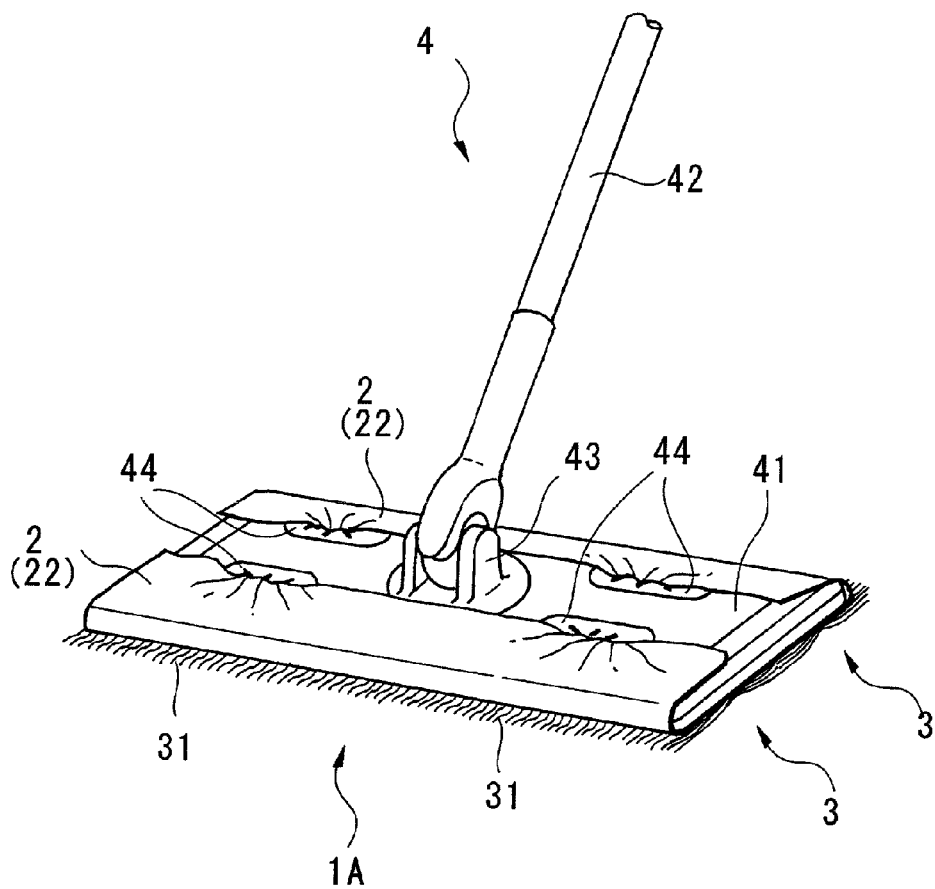
FIG. 6 is a perspective illustrating how the cleaning sheet of FIG. 1 is attached to a cleaning tool.

As illustrated in FIG. 6, the cleaning sheet 1A of the first embodiment is used on a cleaning tool 4 that has a head 41 and a handle 42 connected to the head 41, with the substrate sheet 2 being utilized to attach the cleaning sheet 1A to the head 41.

The cleaning tool 4 illustrated in FIG. 6 includes a head 41 to which the cleaning sheet 1A of the present embodiment can be attached, and a rod-like handle 42 connected to the head 41 via a universal joint 43. The attachment surface (bottom surface) of the head 41 is rectangular as viewed from above. Normally, the cleaning tool 4 is used to perform cleaning by moving (particularly back and forth) the head 41 in its width direction (the direction of its shorter sides). In other words, the cleaning direction of the cleaning tool 4 is in the width direction of the head 41.

The cleaning sheet 1A of the first embodiment is attached to the attachment surface (bottom surface) of the head 41 by arranging the length direction of the substrate sheet 2 in the same direction as the length direction of the head 41 of the cleaning tool 4 and matching the central point of the substrate sheet 2 with the central point of the head 41. Then, the flaps 22, 22 of the substrate sheet 2 are folded back toward the upper surface of the head 41. The flaps 22 are then pressed into a plurality of flexible sheet retainers 44 provided in the head 41, each having slits in a radial pattern. In this way, the cleaning sheet 1A can be fixed to the head 41 of the cleaning tool 4. Note that it is preferable to form the substrate sheet 2 out of a netted sheet because of the good engagement between the substrate sheet 2 and the sheet retainers 44. The cleaning sheet 1A of the present embodiment can be used in this state for sweeping wooden floors, for example. Accordingly, the orientation direction of the long fibers 31 in the long-fiber bundles 3, which matches the width direction of the substrate sheet 2, is oriented substantially in the cleaning direction of the cleaning tool 4.

When attached to the head 41 of a cleaning tool 4, the cleaning sheet 1A of the first embodiment can be used for cleaning, such as sweeping (mopping) wooden-floored rooms, in the same way as ordinary mopping tools.

As illustrated in FIGS. 1 and 2, in the cleaning sheet 1A of the first embodiment, the fiber-joining section 32 for forming the long-fiber bundle 3 is provided separately from the sheet-joining sections 21 for joining the long-fiber bundle 3 to the substrate sheet 2. Further, as illustrated in FIG. 5, in the present cleaning sheet 1A, the long-fiber bundle 3 and the substrate sheet 2 are not joined together, and are thus separate from one another, between adjacent sheet-joining sections 21, 21, and therefore, the long-fiber bundle 3 is not restrained by the sheet-joining sections 21 in those regions. In other words, the degree of freedom of the long fibers 31 which constitute the long-fiber bundle 3 is not limited by the sheet-joining sections 21 in regions between adjacent sheet-joining sections 21, 21, and thus the dirt trapping capabilities of the cleaning sheet 1A is improved.

Further, as illustrated in FIGS. 1 and 2, in the cleaning sheet 1A of the first embodiment, each sheet-joining section 21 is made long in the orientation direction of the long fibers 31. Such a structure prevents the long fibers 31 from getting tangled and thus improves the dirt trapping capabilities of the cleaning sheet 1A. Further, because the length of each sheet-joining section 21 is oriented in the cleaning direction of the cleaning tool 4 the sheet-joining sections 21 will not get caught in objects-being-cleaned, which can in turn prevent the cleaning sheet 1A from curling up.

Furthermore, as illustrated in FIGS. 1 and 2, the cleaning sheet 1A of the first embodiment has a plurality of linear cut sections 24 formed in a staggered pattern in the length direction of the substrate sheet 2. This increases the degree of freedom of the substrate sheet, which in turn increases the degree of freedom of the fiber bundles 3, and thus improves the cleaning properties.

Next, a cleaning sheet according to a second embodiment of the present invention will be described with reference to FIG. 7.

As for the cleaning sheet 1B of the second embodiment, only the differences from the cleaning sheet 1A of the first embodiment will be described below. Matters that are not particularly described are the same as in the cleaning sheet 1A of the first embodiment, and the descriptions for the cleaning sheet 1A of the first embodiment apply as appropriate thereto.

Figure 7:
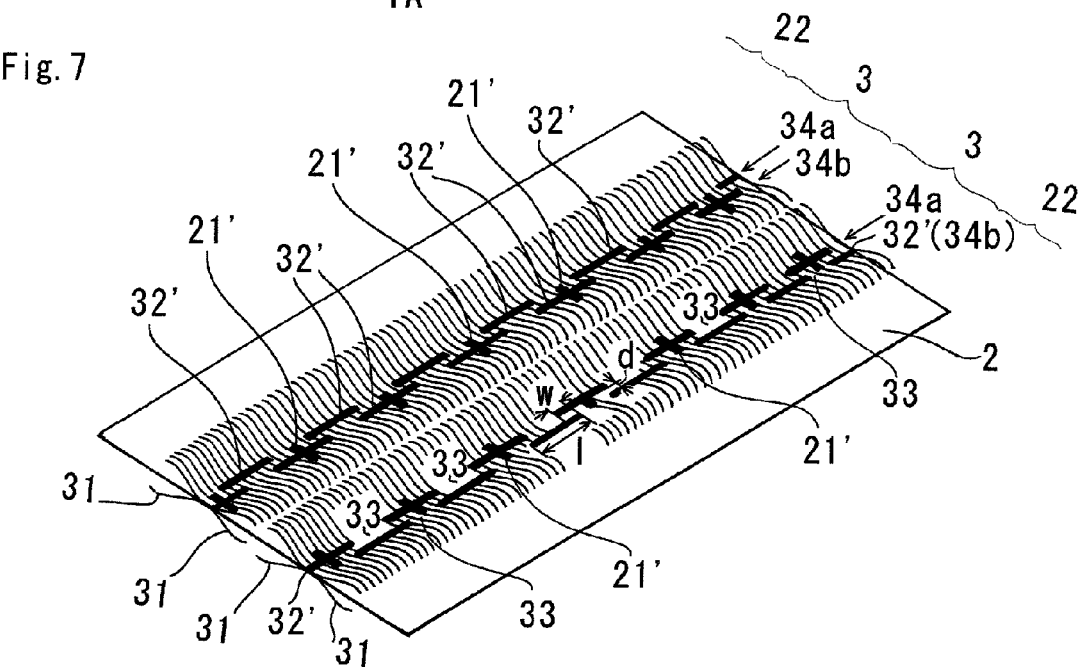
FIG. 7 is a perspective of a cleaning sheet according to a second embodiment of the present invention.

As illustrated in FIG. 7, the cleaning sheet 1B of the second embodiment has a plurality of fiber joining sections 32' formed as two parallel discontinuous lines with alternately-disposed discontinuous sections 33 (i.e., formed in a staggered pattern) in a direction orthogonal to the orientation direction of the long fibers 31, i.e., in the length direction of the substrate sheet 2, thus forming a fiber joining section group as a whole. The second embodiment includes two fiber joining section groups 34$a$, 34$b$.

As for the fiber-joining sections 32' of the cleaning sheet 1B of the second embodiment, respective ends of adjacent fiber-joining sections 32', 32' that form different fiber-joining section groups 34$a$, 34$b$ overlap one another when viewed from the width direction of the substrate sheet 2, as illustrated in FIG. 7. That is, as illustrated in FIG. 7, an end of a fiber-joining section 32' that constitutes one fiber-joining section group 34$a$ overlaps an end of a fiber-joining section 32' that constitutes the other adjacent fiber-joining section group 34$b$. The distance "w" of overlap is preferably 0 mm to 10 mm, and more preferably 0 mm to 5 mm, from the standpoint of joining the fibers together. The distance "d" between a fiber-joining section 32' constituting one fiber-joining section group 34$a$ and a fiber-joining section 32' constituting the other adjacent fiber-joining section group 34$b$ is preferably 1 mm to 50 mm, and more preferably 10 mm to 40 mm, from the standpoint of the degree of freedom of the fiber bundle. The length "l" of each fiber-joining section 32' as illustrated in FIG. 7 is 5 mm to 100 mm. The long-fiber bundle 3 of the cleaning sheet 1B of the second embodiment is formed by such fiber-joining sections 32'.

The sheet-joining sections 21' of the cleaning sheet 1B of the second embodiment are disposed on some of the fiber-joining sections 32', as illustrated in FIG. 7, and in the present embodiment, the sheet-joining sections 21' are in contact with some of the fiber-joining sections 32'. More specifically, in some of the fiber-joining sections 32' described above, each sheet-joining section 21' orthogonally intersects the fiber-joining section 32' as illustrated in FIG. 7, and in this way, only the portion of the fiber-joining section 32' intersected by the sheet-joining section is joined to the substrate sheet 2, while the other portions of the fiber-joining section 32' are not joined to the substrate sheet 2. Note that the other fiber-joining sections 32' except for the above-described "some of the fiber-joining sections 32'" are not in contact with the sheet-joining sections 21', and thus, as regards those other fiber-joining sections 32', the entire fiber-joining section is not joined to the substrate sheet.

The actions and effects of the above-described cleaning sheet 1B of the second embodiment of the present invention, when in use, will be described below.

The cleaning sheet 1B of the second embodiment, when attached to the head 41 of a cleaning tool 4, can be used for cleaning, such as sweeping (mopping) wooden-floored rooms, in the same way as ordinary mopping tools.

The cleaning sheet 1B of the second embodiment can achieve the same effects as those of the cleaning sheet 1A of the first embodiment. That is, the degree of freedom of the long fibers 31 which constitute the long-fiber bundle 3 is not limited by the sheet-joining sections 21' in regions between adjacent sheet-joining sections 21', 21', and thus the dirt trapping capabilities of the cleaning sheet 1B is improved.

Next, a preferred embodiment of a process for producing a cleaning sheet according to the present invention will be described with reference to FIG. 8, taking, as an example, a procedure of producing the above-described cleaning sheet 1A of the first embodiment illustrated in FIGS. 1 to 3.

In the production process of the first embodiment, a cleaning sheet 1A is produced through the following steps (1) to (6):

(1) Long-fiber bundle forming step;
(2) Long-fiber bundle cutting step;
(3) Long-fiber bundle supplying step;
(4) Laminated structure forming step;
(5) Cleaning sheet forming step; and
(6) Cut section forming step.

Figure 8:
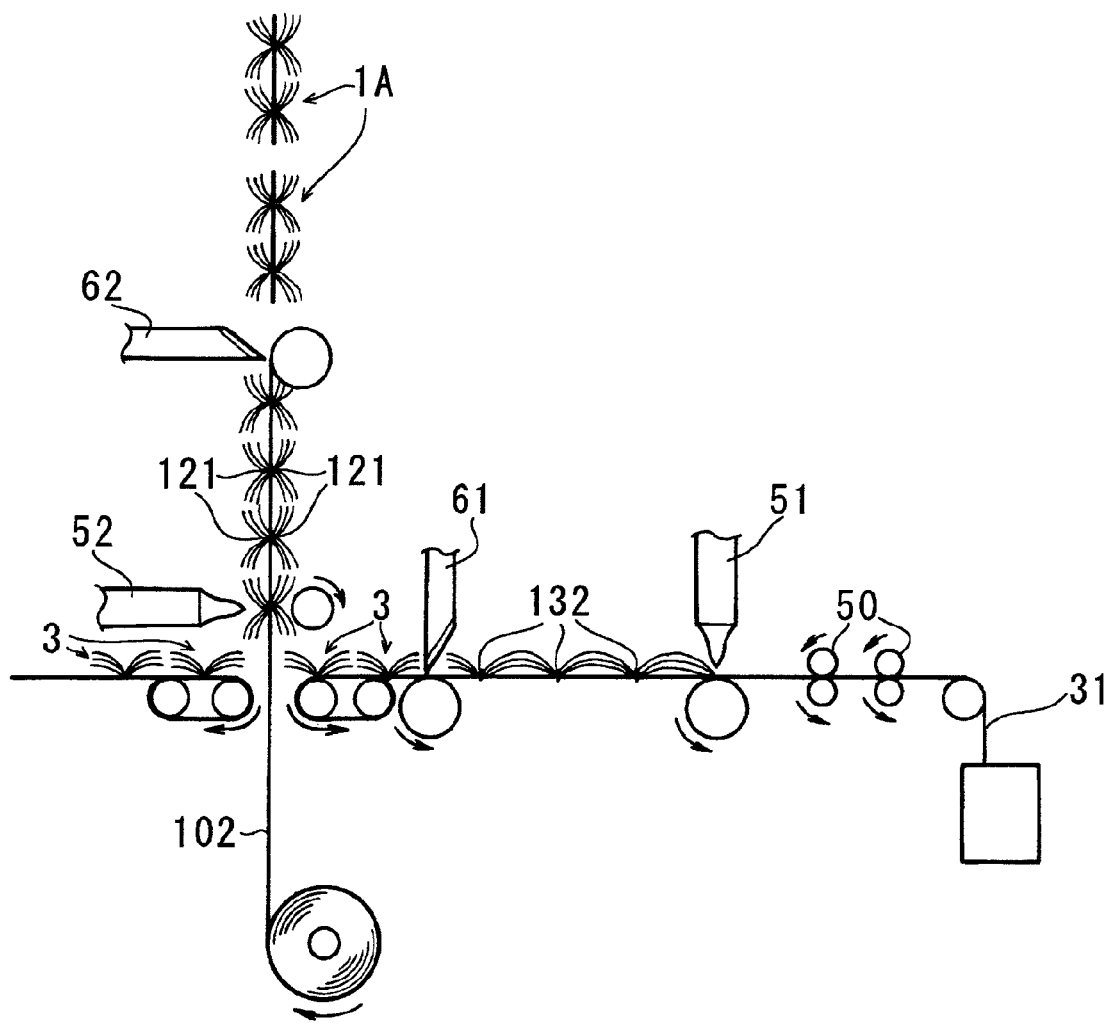
FIG. 8 is a diagram schematically illustrating an overview of an embodiment of a process for producing a cleaning sheet of the present invention.

(1) Long-fiber bundle forming step:

As illustrated in FIG. 8, in this step, an aggregate of long fibers 31 oriented in one direction is wound off, the aggregate is widened in a predetermined width direction with a widening roll 50, and the long fibers 31 are joined together with a fiber-joining section 32 extending in a direction intersecting the orientation direction of the long fibers 31 (the carrying direction of the long fibers 31), to form a single-piece long-fiber bundle 3.

The fiber-joining section 32 is formed as a continuous central sealing line 132 extending substantially continuously in a direction orthogonal to the orientation direction of the long fibers 31 (to the carrying direction of the long fibers 31). In the present step, the continuous central sealing line 132, which becomes the fiber-joining section 32, is formed by pressing with a first heat embossing device 51. Such continuous central sealing lines 132 are formed intermittently in the orientation direction of the long fibers 31 contained in the wound-off aggregate of long fibers 31. The continuous central sealing line 132 is formed by known sealing means, such as heat sealing or ultrasonic sealing, so that it does not peel apart.

(2) Long-fiber bundle cutting step:

As illustrated in FIGS. 8 and 3, in this step, the single-piece long-fiber bundle 3 is cut into a predetermined length. In the present step, each long-fiber bundle 3 illustrated in FIG. 3 is prepared by pressing and cutting the long fibers 31 with a first cutter 61 between adjacent ones of continuous central sealing lines 132, 132 in a direction orthogonal to the orientation direction of the long fibers 31 (to the carrying direction of the long fibers 31).

(3) Long-fiber bundle supplying step:

As illustrated in FIG. 8, in this step, the long-fiber bundle 3 that has been cut into the predetermined length is supplied onto at least one side of a continuous belt-like nonwoven fabric 102. As illustrated in FIGS. 8 and 1, a continuous belt-like nonwoven fabric 102 is wound off, and the long-fiber bundles 3 are supplied in the same direction as the orientation direction of the long fibers 31 onto both the outer side and the inner side of the belt-like nonwoven fabric 102. Note that the nonwoven fabric 102 becomes the substrate sheet 2.

(4) Laminated structure forming step:

As illustrated in FIG. 8, in this step, each long-fiber bundle 3 thus cut into the predetermined length and the belt-like nonwoven fabric 102 are joined by sheet-joining sections 21, to form a laminated structure 5. As illustrated in FIGS. 8 and 1, discontinuous side sealing lines 121, which become the sheet-joining sections 21, are formed by pressing with a second heat embossing device 52 and formed intermittently in a direction orthogonal to the orientation direction of the long fibers 31—i.e., in a direction orthogonal to the carrying direction of the nonwoven fabric 102. Further, as illustrated in FIGS. 8 and 1, each of the intermittently-formed discontinuous side sealing lines 121 is long in the orientation direction of the long fibers 31, and the discontinuous side sealing lines 121 are formed in perpendicular contact with each continuous central sealing line 132. The sealing means used for the discontinuous side sealing lines 121 is the same as those given for the continuous central sealing line.

(5) Cleaning sheet forming step:

As illustrated in FIG. 8, in this step, the laminated structure 5 is cut into a predetermined length, to form individual cleaning sheets 1A. The belt-like nonwoven fabric 102 is pressed and cut with a second cutter 62 such that it becomes shorter in the carrying direction than its width. It is preferable to cut the laminated structure 5 such that 2 to 30 long-fiber bundles 3, per side, are disposed on both sides of the belt-like substrate sheet 2. In the first embodiment, a cleaning sheet 1A having two long-fiber bundles 3 per side is produced.

(6) Cut section forming step:

In this step, staggered-pattern slits are cut between adjacent discontinuous side sealing lines 121, 121 in a direction orthogonal to the orientation direction of the long fibers 31 (the carrying direction of the nonwoven fabric 102), to form linear cut sections 24. This step is performed between the laminated structure forming step (4) and the cleaning sheet forming step (5).

The production process of the first embodiment also preferably includes the following step (7):

(7) Step of opening the long fibers so that they are fluffed three-dimensionally and randomly:

This step is performed after the laminated structure forming step. In this step, the long-fiber bundles 3 on the laminated structure 5 are air-blown to open and fluff the long fibers 31.

Next, a production process according to a second embodiment for producing the above-described cleaning sheet 1B of the second embodiment illustrated in FIG. 7 will be described according to a preferred embodiment thereof.

The production process of the second embodiment is similar to the production process of the first embodiment, except that the long-fiber bundle forming step (1) and the laminated structure forming step (4) therein are different, and thus descriptions for the production process of the first embodiment apply as appropriate hereto.

In the long-fiber bundle forming step (1) in the production process of the second embodiment, the fiber-joining sections 32' are formed as discontinuous central sealing lines 132' in a staggered pattern extending in a direction orthogonal to the orientation direction of the long fibers 31 (the carrying direction of the nonwoven fabric 102).

Further, in the laminated structure forming step (4) in the production process of the second embodiment, the discontinuous side sealing lines 121' are formed orthogonally intersecting the discontinuous central sealing line 132'.

The cleaning sheet of the present invention is not limited to the above-described cleaning sheet of the first or second embodiment and may be modified as appropriate. Further, the features of the cleaning sheet of the first or second embodiment may be combined as appropriate without departing from the gist of the invention.

For example, in the above-described cleaning sheet 1A or 1B of the first or second embodiment, the fiber-joining sections 32, 32' extend in a direction orthogonal to the orientation direction of the long fibers 31 as illustrated in FIGS. 1, 2, and 7, but it will suffice if they intersect the orientation direction of the long fibers 31.

Further, in the above-described cleaning sheet 1A or 1B of the first or second embodiment, the size of the sheet-joining sections 21, 21' may be made different from one another.

Further, in the above-described cleaning sheet 1A or 1B of the first or second embodiment, the distance between a sheet-joining section 21 or 21' and an adjacent sheet-joining section 21 or 21' was substantially equal, but the distance therebetween may be varied. For example, the distance between adjacent ones of sheet-joining sections 21, 21' located in the central area of the cleaning sheet may be made wider than those located in the lengthwise end sections.

Further, the process for producing the cleaning sheet of the present invention is not limited to the above-described first and second embodiments and may be modified as appropriate as long as such modifications do not depart from the gist of the invention.

For example, the above-described production process of the first and second embodiments includes a long-fiber bundle cutting step (2) between the long-fiber bundle forming step (1) and the long-fiber bundle supplying step (3), but the long-fiber bundle does not have to be cut at this stage and may be supplied directly to the long-fiber bundle supplying step right after it is formed.

Further, the process includes a cut section forming step (6) between the laminated structure forming step (4) and the cleaning sheet forming step (5), but this step does not have to be provided.

Further, in the long-fiber bundle cutting step (2), the long-fiber bundle may be cut per every two continuous central sealing lines 132, 132 so that each long-fiber bundle 3 has two continuous central sealing lines 132, 132 as a pair; and in the cut section forming step (6), the linear cut sections 24 may be formed by cutting slits between the pair of continuous central sealing lines 132, 132.

Further, in the long-fiber bundle cutting step (2), the long-fiber bundle 3 may be cut so that it has two continuous central sealing lines 132, 132 without cutting the fibers between the two continuous central sealing lines 132, 132; and in the cut section forming step (6), the linear cut sections 24 may be formed by cutting slits between the pair of continuous central sealing lines 132, 132.

Next, a cleaning sheet according to a third embodiment of the present invention will be described with reference to FIGS. 9 to 12.

As for the cleaning sheet 1C of the third embodiment, the differences from the cleaning sheet 1A of the first embodiment will be described below. Matters that are not particularly described are the same as in the cleaning sheet 1A of the first embodiment, and the descriptions for the cleaning sheet 1A of the first embodiment apply as appropriate thereto.

As illustrated in FIGS. 9 to 12, the cleaning sheet 1C of the third embodiment is made by joining, to at least one side of a substrate sheet 2, a long-fiber bundle which is made by joining, into a fiber bundle, a multitude of long fibers 31 oriented in substantially one direction with a plurality of fiber-joining sections 32 extending linearly in a direction intersecting the orientation direction of the long fibers 31. The plurality of fiber-joining sections 32 of the cleaning sheet 1C are disposed with a predetermined spacing therebetween. The multitude of long fibers 31 are cut between adjacent ones of the fiber-joining sections 32, 32 by a plurality of linear cut sections 24. The cleaning sheet 1C has two parallel discontinuous lines 26a, 26b formed by alternately disposing the linear cut sections 24 and non-cut sections 25. The two discontinuous lines 26a, 26b look continuous when viewed from the orientation direction of the long fibers 31.

The cleaning sheet 1C of the third embodiment will be described in detail.

The cleaning sheet 1C is produced by: forming a long-fiber bundle 3 by joining a multitude of long fibers 31 with a plurality of fiber-joining sections 32 into a fiber bundle; joining the long-fiber bundle 3 on the surface of the substrate sheet 2; and cutting between adjacent fiber-joining sections 32, 32 with linear cut sections 24.

The cleaning sheet may have a long-fiber bundle 3 on one or both sides of the substrate sheet 2. Below, a cleaning sheet 1C having a long-fiber bundle 3 on both sides of the substrate sheet 2 will be described in detail with reference to the drawings.

Figure 9:
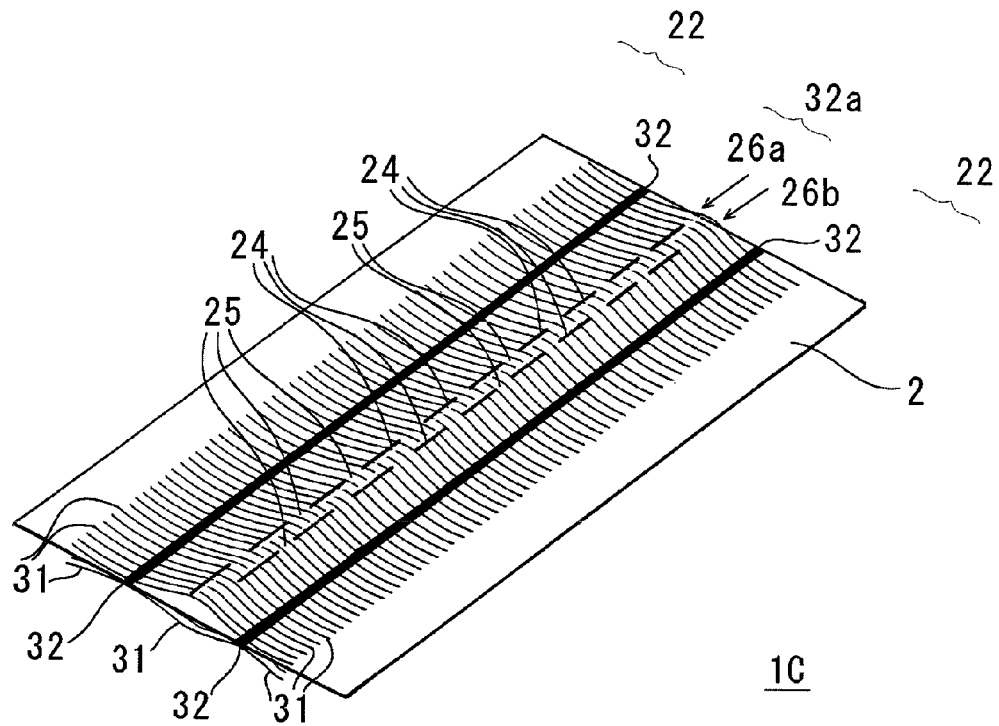
FIG. 9 is a perspective of a cleaning sheet according to a third embodiment of the present invention.
Figure 10:
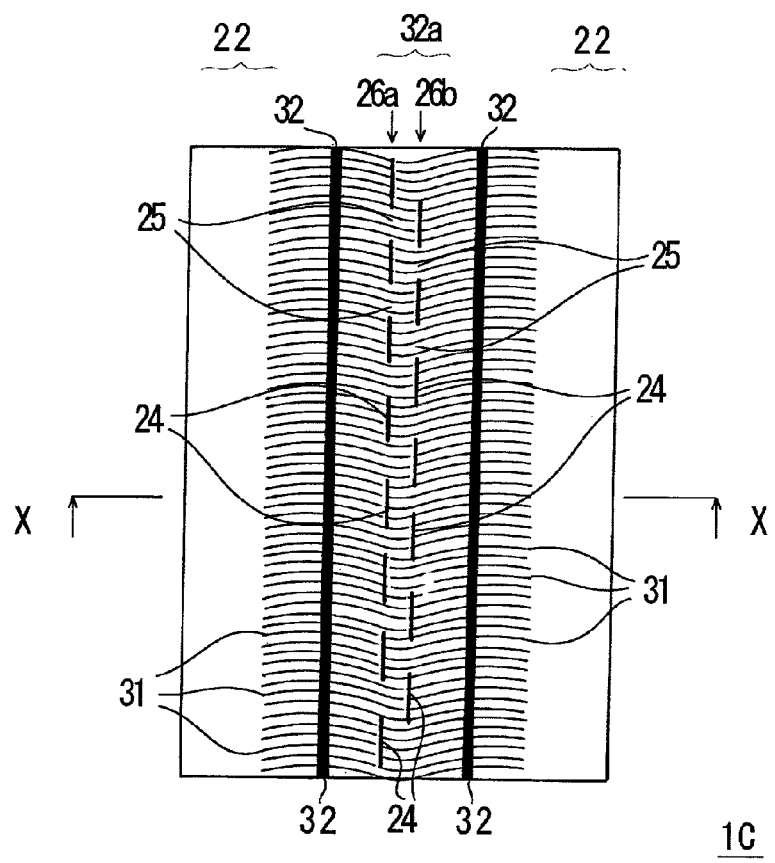
FIG. 10 is a plan view of the cleaning sheet of FIG. 9.

As illustrated in FIGS. 9 and 10, the substrate sheet 2 is rectangular. The length of the substrate sheet 2 is 10 cm to 60 cm, and the width of the substrate sheet 2 is 5 cm to 40 cm. In the cleaning sheet 1C, the long fibers 31 are disposed on both sides of the substrate sheet 2 by fiber-joining sections 32.

Generally, the long fibers 31 are oriented in a direction in which the material therefor is carried during production.

Herein, the expression "the long fibers 31 are oriented in substantially one direction" does not intend to exclude instances where the orientation direction of some of the long fibers 31 deviates from the orientation direction of the rest of the majority of the long fibers 31 due to manufacturing error, crimping of the long fibers 31, and so forth.

As illustrated in FIGS. 9 and 10, in the cleaning sheet 1C of the third embodiment, the multitude of long fibers 31 are disposed on both sides of the substrate sheet 2 such that the direction orthogonal to the orientation direction of the long fibers 31 matches the length direction of the substrate sheet 2. In other words, the orientation direction of the long fibers 31 matches the width direction of the substrate sheet 2. As illustrated in FIGS. 9 and 10, the multitude of long fibers 31 in the cleaning sheet 1C of the third embodiment are disposed evenly spanning the opposite ends, in the length direction, of the substrate sheet 2, and occupy 50% to 90% of the width of the substrate sheet 2. In the present embodiment, the width of the substrate sheet 2 is larger than the area in which the long fibers 31 are disposed, and the regions of the substrate sheet 2 located outward widthwise of the long fibers 31 (which are referred to hereinafter as "flaps 22") becomes sections that are used to attach the cleaning sheet to a head of a cleaning tool (described in detail further below).

It is preferable to provide 1,000 to 50,000 pieces per centimeter of substrate sheet 2, and more preferably 5,000 to 40,000 pieces per centimeter, of long fibers 31 in the length direction of the substrate sheet 2 on one side thereof from the standpoint of dust trapping capabilities.

In the present embodiment, the long fibers 31 are used in the form of a fiber aggregate (tow). It is preferable to sufficiently open the fiber aggregate (tow) with a known opening device beforehand. While the thickness of the long fibers 31 is not particularly critical, the thickness is preferably 0.1 to 200 dtex, and more preferably 2 to 30 dtex, from the standpoint of securing dust trapping capabilities and preventing scratches on the surface of an object-being-cleaned.

It is also preferable to use crimped fibers as the long fibers 31 because the dust trapping capabilities can be further improved.

Also, colors other than white (such as orange or light blue) may be used for the long fibers 31 in order, for example, to improve the product appearance and visibility of any soil attached.

The fiber-joining sections 32 are for forming the multitude of long fibers 31 into a long-fiber bundle. In the present embodiment, the fiber-joining sections 32 are not only used for forming the long-fiber bundle 3, but are used for joining the long-fiber bundle 3 to the surface of the substrate sheet 2. The fiber-joining section 32 is formed by heat-fusing or with a hot-melt adhesive, and in the present embodiment, it is formed by heat-fusing.

The number of fiber-joining sections 32 on the cleaning sheet 1C of the present embodiment is preferably 2 to 30. The cleaning sheet 1C of the present embodiment has two fiber-joining sections 32, which will be described below with reference to the drawings. In the present embodiment, as illustrated in FIGS. 9 and 10, each of the two fiber-joining sections 32, 32 is formed as a single continuous straight line extending in the direction orthogonal to the orientation direction of the long fibers 31—i.e., spanning the opposite ends, in the length direction, of the substrate sheet 2.

As illustrated in FIGS. 9 and 10, the length of each fiber-joining section 32 is the same as the length of the substrate sheet 2, and the width of each fiber-joining section 32 as illustrated in FIGS. 9 and 10 is 0.5 mm to 10 mm. The two adjacent fiber-joining sections 32, 32 are disposed with a predetermined spacing therebetween, and the spacing is preferably 1 mm to 50 mm, more preferably 10 mm to 40 mm, from the standpoint of the degree of freedom of the fibers.

Figure 11:
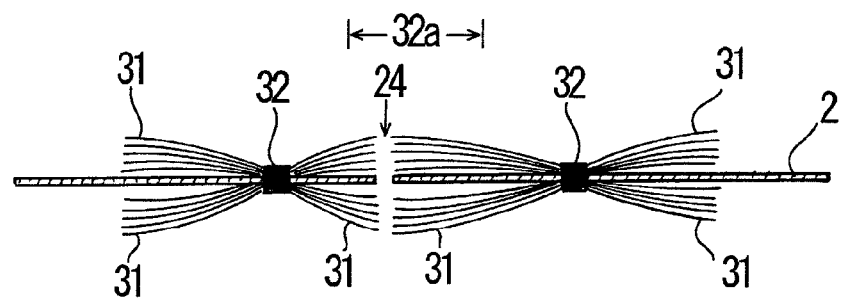
FIG. 11 is a partial cross-sectional view of the cleaning sheet of FIG. 10 taken along line X-X.

The cleaning sheet 1C of the third embodiment is obtained by cutting the long fibers 31 and also the substrate sheet 2 at the same positions as the long fibers 31 with linear cut sections 24 in a central area 32a between the two fiber-joining sections 32, 32, as illustrated in FIG. 11. The central area 32a is located substantially in the middle of the adjacent fiber-joining sections 32, 32 and is 1 cm to 10 cm wide.

Figure 12:
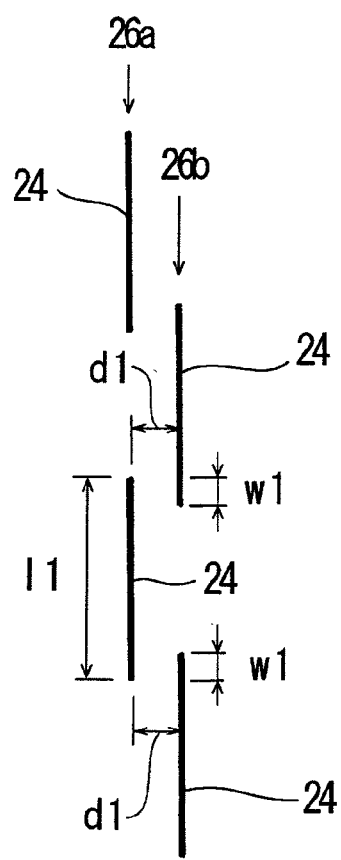
FIG. 12 is an enlarged view of a plurality of linear cut sections in the cleaning sheet of the third embodiment.

As illustrated in FIGS. 9 and 10, the plurality of linear cut sections 24 are formed in the length direction of the substrate sheet 2 as two parallel discontinuous lines with alternately-disposed discontinuous sections 25—i.e., the linear cut sections 24 are disposed in a staggered pattern. As illustrated in FIGS. 9 and 10, the linear cut sections 24 are arranged in a staggered pattern in the length direction of the substrate sheet 2, thus forming, as a whole, discontinuous lines 26a, 26b respectively composed of two groups of linear cut sections 24. The two discontinuous lines 26a, 26b each look discontinuous as viewed from above as illustrated in FIGS. 10 and 12, but together form a single continuous line when viewed from the orientation direction of the long fibers 31. By arranging the two discontinuous lines 26a, 26b such that they form a single continuous line when viewed from the orientation direction of the long fibers 31, the long fibers 31 between the two fiber-joining sections 32, 32 can be cut reliably.

As illustrated in FIGS. 10 and 12, respective ends of adjacent linear cut sections 24 that form different discontinuous lines 26a, 26b overlap one another when viewed from the orientation direction of the long fibers 31—i.e., the width direction of the substrate sheet 2. More specifically, as illustrated in FIG. 12, an end of a linear cut section 24 that constitutes one discontinuous line 26a overlaps an end of a linear cut section 24 that constitutes the other adjacent discontinuous line 26b. The distance "w1" of overlap is preferably equal to or above 0 mm and below 5 mm, and more preferably 0.1 mm to 2 mm, from the standpoint of cutting the fibers apart. The distance "d1" between a linear cut section 24 constituting one discontinuous line 26a and a linear cut section 24 constituting the other adjacent discontinuous line 26b is preferably 1 mm to 50 mm, and more preferably 5 mm to 30 mm, from the standpoint of the fiber length and the strength of the substrate sheet. The length "l1" of each linear cut section 24 as illustrated in FIG. 12 is 5 mm to 50 mm.

Note that it is preferable to completely cut all of the long fibers 31 between the adjacent fiber-joining sections 32, 32 with the linear cut sections 24, but it is considered that the long fibers are "completely cut" if 95% or more of the long fibers have been cut.

Because the linear cut sections 24 are arranged in a staggered pattern, both the fiber-joining sections 32, 32 in the cleaning sheet 1C of the third embodiment, which is produced by cutting with the linear cut sections 24, are formed to have two fiber lengths as illustrated in FIGS. 9 and 10: a longer fiber length, and a shorter fiber length. From the standpoint of dust trapping capabilities, the longer fiber length of the long fiber 31 is preferably 20 to 50 mm, and more preferably 20 to 30 mm, whereas the shorter fiber length of the long fibers 31 is preferably 10 to 25 mm, and more preferably 10 to 20 mm. The "fiber length of the long fiber 31" refers to the length from the fiber-joining section 32 to the tip end of each long fiber 31.

Note that, from the standpoint of dust trapping capabilities, the fiber length of the long fibers 31 extending outward, in the width direction of the cleaning sheet 1C, from the respective fiber-joining sections 32, 32 of the cleaning sheet 1C of the third embodiment is preferably 10 to 150 mm, and more preferably 30 to 120 mm.

Next, the materials for forming the cleaning sheet 1C of the third embodiment will be described.

The substrate sheet 2 is flexible in its length direction, and thus easily conforms to the contour of an object-being-cleaned. Accordingly, the cleaning sheet 1C becomes conformable to the contour of an object-being-cleaned, thus exhibiting an excellent dirt-and-dust trapping effect.

The same materials as explained in the cleaning sheet 1A of the first embodiment can be used for the substrate sheet 2 and the long fibers 31.

The actions and effects of the above-described cleaning sheet 1C of the third embodiment of the present invention, when in use, will be described below.

Figure 13:
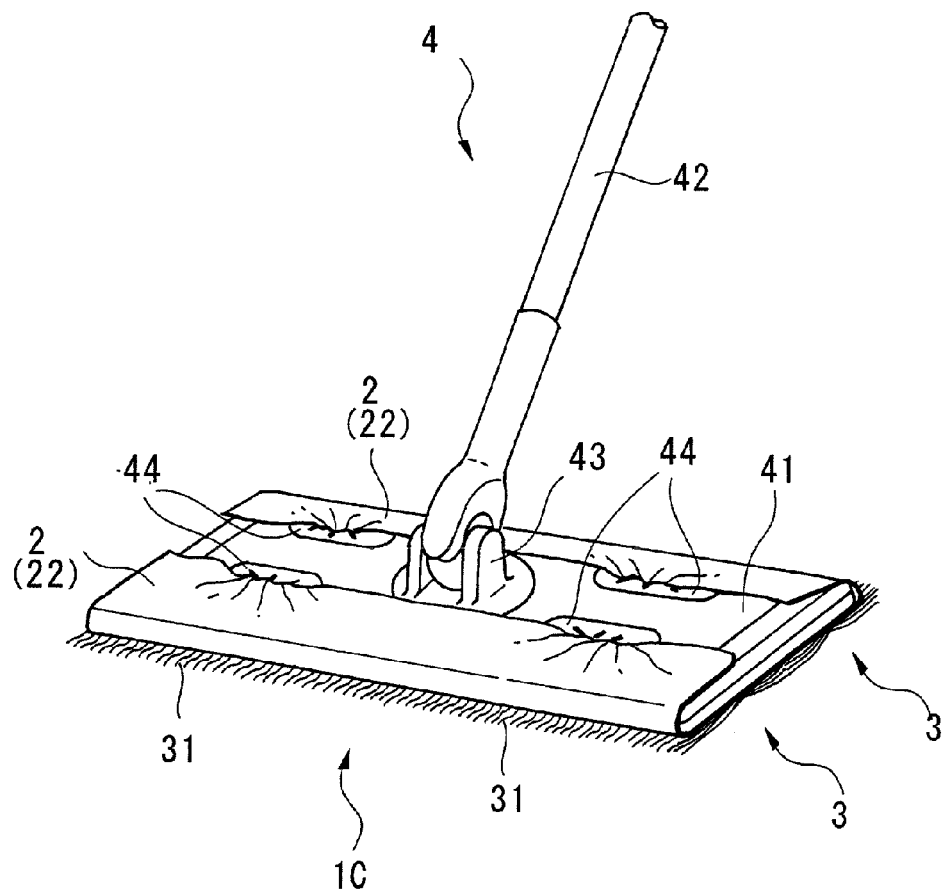
FIG. 13 is a perspective illustrating how the cleaning sheet of FIG. 9 is attached to a cleaning tool.

As illustrated in FIG. 13, the cleaning sheet 1C of the third embodiment is used on a cleaning tool 4 that has a head 41 and a handle 42 connected to the head 41, with the substrate sheet 2 being utilized to attach the cleaning sheet 1C to the head 41.

The cleaning tool 4 illustrated in FIG. 13 includes a head 41 to which the cleaning sheet 1C of the present embodiment can be attached, and a rod-like handle 42 connected to the head 41 via a universal joint 43. The attachment surface (bottom surface) of the head 41 is rectangular as viewed from above. Normally, the cleaning tool 4 is used to perform cleaning by moving (particularly back and forth) the head 41 in its width direction (the direction of its shorter sides). In other words, the cleaning direction of the cleaning tool 4 is in the width direction of the head 41.

The cleaning sheet 1C of the third embodiment is attached to the attachment surface (bottom surface) of the head 41 by arranging the length direction of the substrate sheet 2 in the same direction as the length direction of the head 41 of the cleaning tool 4 and matching the central point of the substrate sheet 2 with the central point of the head 41. Then, the flaps 22, 22 of the substrate sheet 2 are folded back toward the upper surface of the head 41. The flaps 22 are then pressed into a plurality of flexible sheet retainers 44 provided in the head 41, each having slits in a radial pattern. In this way, the cleaning sheet 1C can be fixed to the head 41 of the cleaning tool 4. Note that it is preferable to form the substrate sheet 2 out of a netted sheet because of the good engagement between the substrate sheet 2 and the sheet retainers 44. The cleaning sheet 1C of the present embodiment can be used in this state for sweeping wooden floors, for example. Accordingly, the orientation direction of the long fibers 31, which matches the width direction of the substrate sheet 2, is oriented substantially in the cleaning direction of the cleaning tool 30.

When attached to the head 41 of a cleaning tool 4, the cleaning sheet 1C of the third embodiment can be used for cleaning, such as sweeping (mopping) wooden-floored rooms, in the same way as ordinary mopping tools.

As illustrated in FIGS. 9 to 11, in the cleaning sheet 1C of the third embodiment, the long fibers 31 between adjacent fiber-joining sections 32, 32 are cut by a plurality of linear cut sections 24 that extend so as to form two parallel discontinuous lines but that look like a single continuous line when viewed from the orientation direction of the long fibers, and in this way, they can be cut reliably.

Accordingly, the long fibers 31 are not restrained by the fiber-joining sections 32, thus improving the dirt trapping capabilities of the cleaning sheet 1C. Also, the long fibers 31 are less prone to get caught in objects-being-cleaned.

Further, as illustrated in FIGS. 9 to 11, in the cleaning sheet 1C of the third embodiment, the long fibers 31 between adjacent fiber-joining sections 32, 32 are cut by a plurality of linear cut sections 24 that form a staggered pattern. Accordingly, each of the adjacent fiber-joining sections 32, 32 has long fibers 31 having two different fiber lengths: a longer fiber length, and a shorter fiber length. These two fiber lengths are also different from the fiber length of the long fibers 31 extending outward, in the width direction of the cleaning sheet 1C, from the respective fiber-joining sections 32, 32.

Accordingly, the fiber length of the long fibers 31 belonging to each of the fiber-joining sections 32, 32 is not uniform, but instead there are three types of fiber lengths. Such a structure makes the fiber lengths random and thus allows the dirt trapping capabilities to be improved. Further, by fluffing and opening, in a three-dimensional and random manner, the long fibers 31 having three different fiber lengths after cutting them with the linear cut sections 24, the fiber lengths of the long fibers 31 become even more random, which further improves the dirt trapping capabilities.

Next, a cleaning sheet according to a fourth embodiment of the present invention will be described with reference to FIG. 14.

As for the cleaning sheet 1D of the fourth embodiment, the differences from the cleaning sheet 1C of the third embodiment will be described below. Matters that are not particularly described are the same as in the cleaning sheet 1C of the third embodiment, and the descriptions provided for the cleaning sheet 1C of the third embodiment apply as appropriate thereto.

Figure 14:
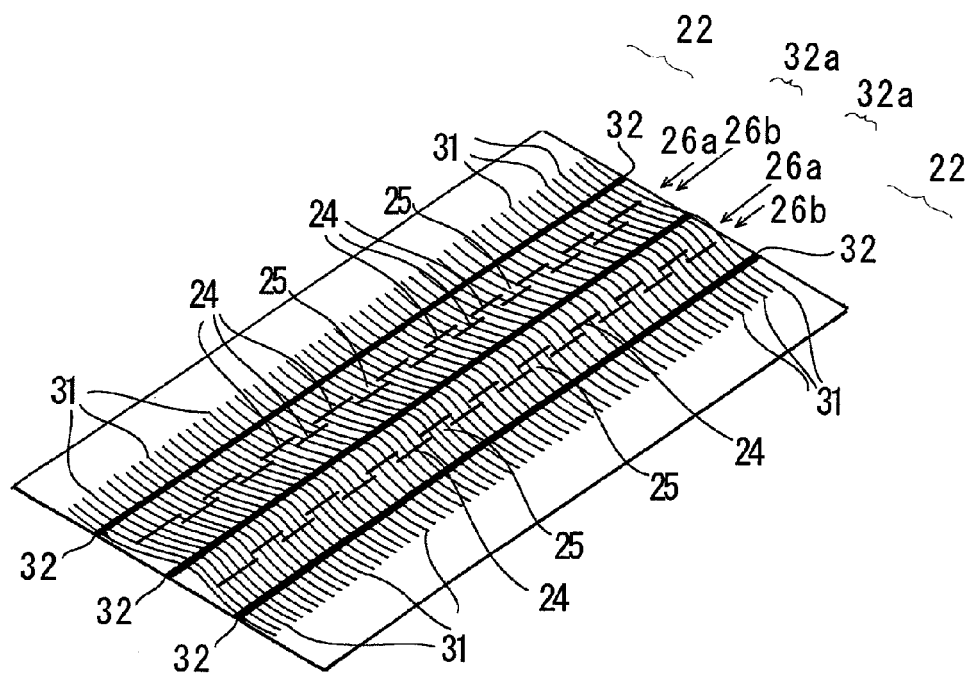
FIG. 14 is a perspective of a cleaning sheet according to a fourth embodiment of the present invention.

The number of fiber joining sections 32 on the cleaning sheet 1D of the fourth embodiment is three, and as illustrated in FIG. 14, each of the three fiber-joining sections 32, 32, 32 is formed as a single continuous straight line extending in the direction orthogonal to the orientation direction of the long fibers 31—i.e., spanning the opposite ends, in the length direction, of the substrate sheet 2.

As regards the plurality of linear cut sections 24 of the cleaning sheet 1D of the fourth embodiment, the linear cut sections 24 are arranged in a staggered pattern to form two discontinuous lines 26a, 26b, as with the linear cut sections 24 of the cleaning sheet 1C of the third embodiment. However, in the cleaning sheet 1D of the fourth embodiment, two sets of the discontinuous lines 26a, 26b are formed in a direction orthogonal to the orientation direction of the long fibers 31, as illustrated in FIG. 14. As regards these two sets of the discontinuous lines 26a, 26b, the positions for forming one set of discontinuous lines 26a, 26b within the central area 32a between adjacent fiber-joining sections are displaced so that they are different from the positions for forming the other set of discontinuous lines 26a, 26b.

The actions and effects of the above-described cleaning sheet 1D of the fourth embodiment of the present invention, when in use, will be described below.

The cleaning sheet 1D of the fourth embodiment, when attached to the head 41 of a cleaning tool 4, can be used for cleaning, such as sweeping (mopping) wooden-floored rooms, as with the cleaning sheet 1C of the third embodiment.

The cleaning sheet 1D of the fourth embodiment can achieve the same effects as in the cleaning sheet 1C of the third embodiment. That is, as with the cleaning sheet 1C of the third embodiment, the cleaning sheet 1D of the fourth embodiment has a plurality of linear cut sections 24 that extend so as to form two parallel discontinuous lines but that look like a single continuous line when viewed from the orientation direction of the long fibers, and therefore, the long fibers 31 between adjacent fiber-joining sections 32, 32 can be cut reliably. Also, the long fibers 31 are less prone to get caught in objects-being-cleaned. Further, the fiber lengths of the long fibers 31 become random, thus allowing the dirt trapping capabilities to be improved. Furthermore, the cleaning sheet 1D of the fourth embodiment has two sets of the two discontinuous lines 26a, 26b, and the sets are formed at positions different from one another. Therefore, the fiber lengths of the long fibers 31 become even more random compared to the cleaning sheet 1C of the third embodiment, and thus the dirt trapping capabilities can further be improved.

Next, a cleaning sheet according to a fifth embodiment of the present invention will be described with reference to FIG. 15.

As for the cleaning sheet 1E of the fifth embodiment, the differences from the cleaning sheet 1C of the third embodiment will be described below. Matters that are not particularly described are the same as in the cleaning sheet 1C of the third embodiment, and the descriptions provided for the cleaning sheet 1C of the third embodiment apply as appropriate thereto.

Figure 15:
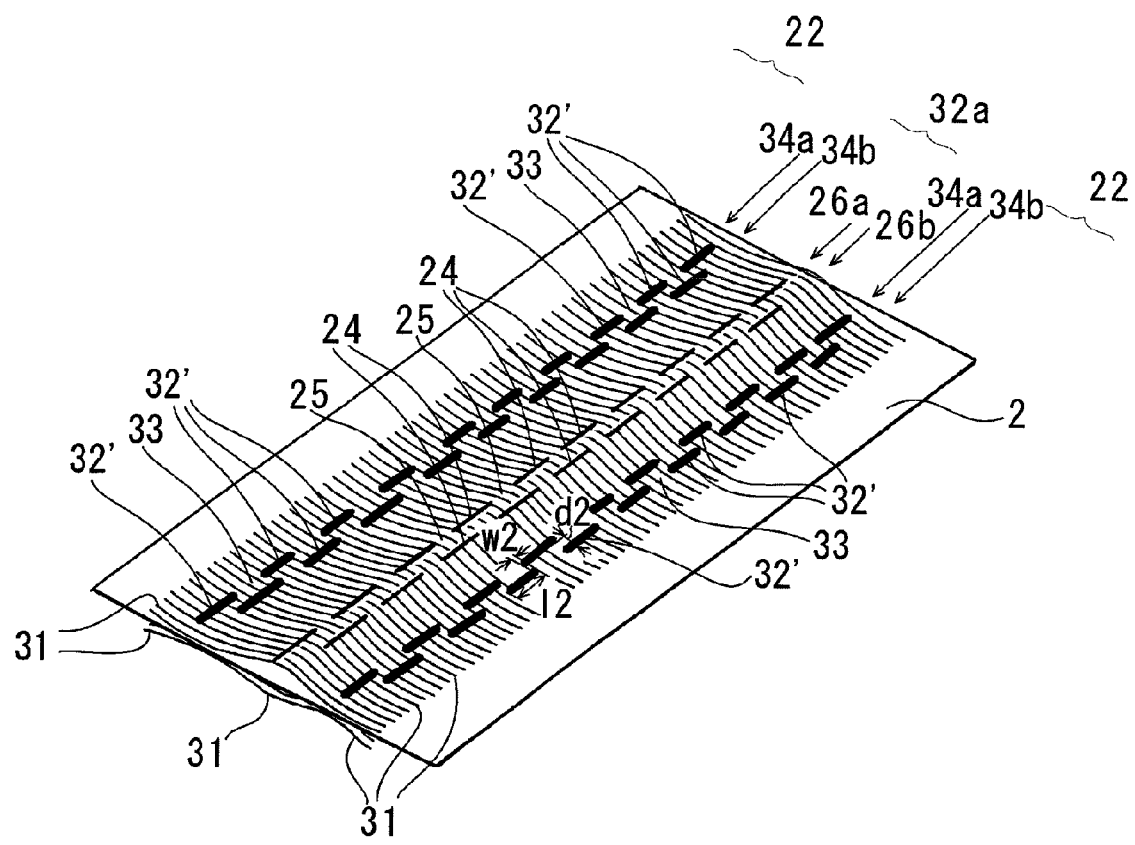
FIG. 15 is a perspective of a cleaning sheet according to a fifth embodiment of the present invention.

As illustrated in FIG. 15, the cleaning sheet 1E of the fifth embodiment has a plurality of fiber-joining sections 32' formed as two parallel discontinuous lines with alternately-disposed discontinuous sections 33 (i.e., formed in a staggered pattern) in a direction orthogonal to the orientation direction of the long fibers 31, i.e., in the length direction of the substrate sheet 2, thus forming a fiber-joining section group as a whole. The fifth embodiment includes two fiber-joining section groups 34a, 34b.

As for the fiber-joining sections 32' of the cleaning sheet 1E of the fifth embodiment, respective ends of adjacent fiber-joining sections 32', 32' that form different fiber-joining section groups 34a, 34b overlap one another when viewed from the width direction of the substrate sheet 2, as illustrated in FIG. 15. That is, as illustrated in FIG. 15, an end of a fiber-joining section 32' that constitutes one fiber-joining section group 34a overlaps an end of a fiber-joining section 32' that constitutes the other adjacent fiber-joining section group 34b. The distance "w2" of overlap is preferably 0 mm to 10 mm, and more preferably 0 mm to 5 mm, from the standpoint of forming a fiber bundle. The distance "d2" between a fiber-joining section 32' constituting one fiber-joining section group 34a and a fiber-joining section 32' constituting the other adjacent fiber-joining section group 34b is preferably 5 mm to 50 mm, and more preferably 10 mm to 40 mm, from the standpoint of the strength of the fiber-joining sections. The length "l2" of each fiber-joining section 32' as illustrated in FIG. 15 is 5 mm to 50 mm.

The actions and effects of the above-described cleaning sheet 1E of the fifth embodiment of the present invention, when in use, will be described below.

The cleaning sheet 1E of the fifth embodiment, when attached to the head 41 of a cleaning tool 4, can be used for cleaning, such as sweeping (mopping) wooden-floored rooms, as with the cleaning sheet 1C of the third embodiment.

The cleaning sheet 1E of the fifth embodiment can achieve the same effects as in the cleaning sheet 1C of the third embodiment. That is, as with the cleaning sheet 1C of the third embodiment, the cleaning sheet 1E of the fifth embodiment has a plurality of linear cut sections 24 that extend so as to form two parallel discontinuous lines but that look like a single continuous line when viewed from the orientation direction of the long fibers, and therefore, the long fibers 31 between adjacent fiber joining sections 32, 32 can be cut reliably. Also, the long fibers 31 are less prone to get caught in objects-being-cleaned. Further, the fiber lengths of the long fibers 31 become random, thus allowing the dirt trapping capabilities to be improved. Furthermore, the cleaning sheet 1E of the fifth embodiment has a plurality of fiber-joining sections 32' formed in a staggered pattern. Therefore, the fiber lengths of the long fibers 31 become even more random compared to the cleaning sheet 1C of the third embodiment, and thus the dirt trapping capabilities can further be improved.

Next, a cleaning sheet according to a sixth embodiment of the present invention will be described with reference to FIG. 16.

As for the cleaning sheet 1F of the sixth embodiment, the differences from the cleaning sheet 1C of the third embodiment will be described below. Matters that are not particularly described are the same as in the cleaning sheet 1C of the third embodiment, and the descriptions provided for the cleaning sheet 1C of the third embodiment apply as appropriate thereto.

Figure 16:
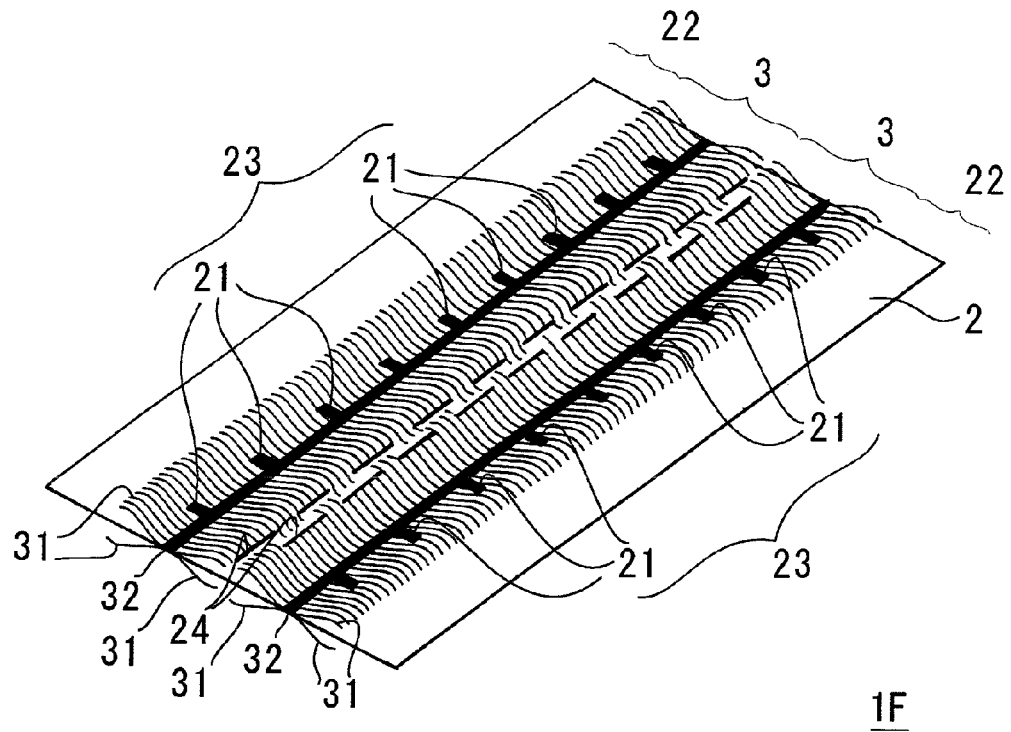
FIG. 16 is a perspective of a cleaning sheet according to a sixth embodiment of the present invention.

As illustrated in FIG. 16, the fiber-joining section 32 of the cleaning sheet 1F of the sixth embodiment is for forming a long-fiber bundle 3 made by aggregating a multitude of long fibers 31, and is a joining section that is not involved in joining the long fibers 31 to the substrate sheet 2. Instead, the long fibers 31, which constitute the long-fiber bundle 3, are joined to the substrate sheet 2 by means of sheet-joining sections 21.

As illustrated in FIG. 16, the plurality of sheet-joining sections 21 of the cleaning sheet 1F of the sixth embodiment are disposed intermittently on the fiber-joining section 32 in a direction intersecting the orientation direction of the long fibers 31, to form a sheet-joining section group 23 as a whole. The linear cut sections 24 of the cleaning sheet 1F of the sixth embodiment are disposed in a central area between the two rows of sheet-joining section groups 23, as illustrated in FIG. 16.

The actions and effects of the above-described cleaning sheet 1F of the sixth embodiment of the present invention, when in use, will be described below.

The cleaning sheet 1F of the sixth embodiment, when attached to the head 41 of a cleaning tool 4, can be used for cleaning, such as sweeping (mopping) wooden-floored rooms, as with the cleaning sheet 1C of the third embodiment.

The cleaning sheet 1F of the sixth embodiment can achieve the same effects as in the cleaning sheet 1C of the third embodiment. That is, as with the cleaning sheet 1C of the third embodiment, the cleaning sheet 1F of the sixth embodiment has a plurality of linear cut sections 24 that extend so as to form two parallel discontinuous lines but that look like a single continuous line when viewed from the orientation direction of the long fibers, and therefore, the long fibers 31 between adjacent fiber-joining sections 32, 32 can be cut reliably. Also, the long fibers 31 are less prone to get caught in objects-being-cleaned. Further, the fiber lengths of the long fibers 31 become random, thus allowing the dirt trapping capabilities to be improved.

The cleaning sheet of the present invention is not limited to the above-described cleaning sheets of the third to sixth embodiments, and can be modified as appropriate. Further, the features of the cleaning sheets of the third to sixth embodiments may be combined as appropriate without departing from the gist of the invention.

Figure 17:
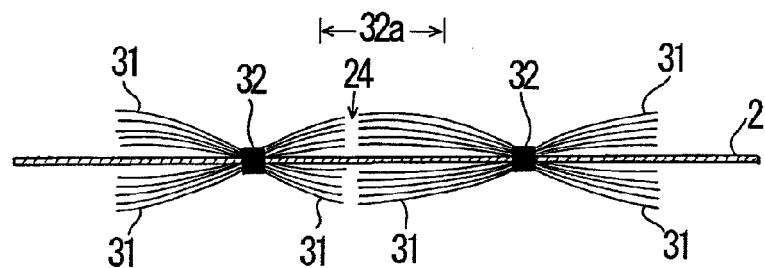
FIG. 17 is a partial cross-sectional view of a cleaning sheet according to another embodiment of the present invention taken along line X1-X1.

For example, in the above-described cleaning sheets 1C, 1D, 1E, and 1F of the third to sixth embodiments, the linear cut sections 24 cut both the long fibers 31 and the substrate sheet 2 at the same positions as the long fibers 31, as illustrated in FIG. 11. However, only the long fibers 31 may be cut, as illustrated in FIG. 17.

Further, in the above-described cleaning sheets 1C, 1D, 1E, and 1F of the third to sixth embodiments, the fiber-joining sections 32, 32' extend in a direction orthogonal to the orientation direction of the long fibers 31, as illustrated in FIGS. 9, 10, 14, 15, and 16. However, the fiber-joining sections only need to intersect the orientation direction of the long fibers 31.

Further, the above-described cleaning sheets 1C, 1D, 1E, and 1F of the third to sixth embodiments are formed so that the direction orthogonal to the orientation direction of the long fibers 31 matches the length direction of the substrate sheet 2, as illustrated in FIGS. 9, 10, 14, 15, and 16, but it does not have to match the length direction of the substrate sheet 2.

Further, in the above-described cleaning sheets 1C, 1D, 1E, and 1F of the third to sixth embodiments, the cut sections 24 are formed in a central area 32a located in substantially the middle of adjacent fiber-joining sections 32, 32, but they only need to be between adjacent fiber-joining sections 32, 32.

Further, in the above-described cleaning sheets 1C, 1D, 1E, and 1F of the third to sixth embodiments, the lengths of the cut sections 24 do not all have to be the same.

EXAMPLES

The present invention will be described in further detail below according to Examples thereof.

Example 1

A cleaning sheet as illustrated in FIG. 1 or 2 was produced. A 2.2-dtex-thick core/sheath heat-fusible conjugate fiber having a polyethylene terephthalate core and a polyethylene sheath was used for the long fibers 31 constituting the long-fiber bundle 3. An opening device was used to open 5 g (about 160,000 pieces of fiber) of fiber bundle (tow) of the conjugate fiber and to widen it to a length of 280 mm and width of 80 mm. To prevent the long fibers 31 from falling apart, a single line of fiber-joining section 32 was applied to a widthwise central area of the long-fiber bundle 3 spanning the entire length thereof in the length direction (i.e., in a direction orthogonal to the orientation direction of the long fibers 31), to join the long fibers together. The fiber-joining section 32 was 3 mm wide. Joining of the fiber-joining section 32 was achieved by heat-fusing. Note that the width direction of the long-fiber bundle 3 matched the orientation direction of the long fibers 31.

By virtue of the fiber-joining section 32 extending in the length direction of the long-fiber bundle 3, the long fibers 31 in the long-fiber bundle 3 were kept in an aggregated state, even when the long-fiber bundle 3 was not joined to the substrate sheet 2.

An air-through nonwoven fabric having a basis weight of 40 g/m$^2$ was used for the substrate sheet 2. The constituent fiber thereof was a core/sheath heat-fusible conjugate fiber (2.2 dtex×51 mm) having a polyethylene terephthalate core and a polyethylene sheath. The substrate sheet 2 was 285 mm long and 205 mm wide.

Two of the long-fiber bundles 3, 3 were placed on one side of the substrate sheet 2, side-by-side without substantially leaving a space therebetween, and were joined to the substrate sheet 2 by the sheet-joining sections 21. Joining of the sheet-joining sections 21 was achieved by heat-fusing. Each sheet-joining section 21 was long in the orientation direction of the long fibers 31, and was 20 mm long and 3 mm wide. The plurality of sheet-joining sections 21 were formed intermittently in a straight line in a direction orthogonal to the orientation direction of the long fibers 31—i.e., in the length direction of the substrate sheet 2—and more specifically, the intervals between adjacent sheet-joining sections 21 were 30 mm. Each sheet-joining section 21 was formed to be in perpendicular contact with the fiber-joining section 32.

Example 2

Example 2 was made just like Example 1, except that the intervals between adjacent sheet-joining sections 21 were changed from those of Example 1. The intervals between adjacent sheet-joining sections 21 in Example 2 were 40 mm.

Example 3

As in Example 2, Example 3 was made just like Example 1, except that the intervals between adjacent sheet-joining sections 21 were changed. The intervals between adjacent sheet-joining sections 21 in Example 3 were 10 mm.

Comparative Example 1

Comparative Example 1 is different from Example 1 in that the sheet-joining sections 21 were not formed intermittently in a direction orthogonal to the orientation direction of the long fibers 31, but a sheet-joining section 21 was formed as a single continuous straight line on the fiber-joining section 32 extending in the same direction as the fiber-joining section 32. In other words, the sheet-joining section 21 and the fiber-joining section 32 had the same shape and size and were formed at the same position. The other features were the same as in Example 1.

Comparative Example 2

Comparative Example 2 was made just like Example 1, except that the intervals between adjacent sheet-joining sections 21 were changed from those of Example 1. The intervals between adjacent sheet-joining sections 21 in Comparative Example 2 were 5 mm.

Comparative Example 3

Comparative Example 3 was made just like Example 1, except that the intervals between adjacent sheet-joining sections 21 were changed from those of Example 1. The intervals between adjacent sheet-joining sections 21 in Comparative Example 3 were 50 mm.

Hair Trapping Capabilities:

Each cleaning sheet according to the Examples and Comparative Examples was attached to the cleaning tool 4 illustrated in FIG. 6 and was used to sweep an eight-tatami-mat-sized wooden-floored room (having a size equal to eight tatami mats, each mat being approximately 182 cm long and 91 cm wide) scattered with strands of hair, to evaluate its hair trapping capabilities. The evaluation criteria were as follows:

A: All the strands of hair were completely trapped
B: Strands of hair were mostly trapped, although a small amount remained
C: Some portions of hair remained without being trapped
F: Almost half of the hair remained without being trapped Bread Crumb Trapping Capabilities:

Each cleaning sheet according to the Examples and Comparative Examples was attached to the cleaning tool 4 illustrated in FIG. 6 and was used to sweep an eight-tatami-mat-sized wooden-floored room scattered with bread crumbs, to evaluate its bread crumb trapping capabilities. The evaluation criteria were as follows:

A: All the bread crumbs were completely trapped
B: Bread crumbs were mostly trapped, although a small amount remained
C: Some portions of bread crumbs remained without being trapped
F: Almost half of the bread crumbs remained without being trapped Evaluation results for the Examples and Comparative Examples are shown in Table 1 below:

TABLE 1

|  | Example 1 | Example 2 | Example 3 | Comp. Example 1 | Comp. Example 2 | Comp. Example 3 |
| --- | --- | --- | --- | --- | --- | --- |
| Hair Trapping Capabilities | A | A | B | B | B | B |
| Bread Crumb Trapping Capabilities | A | B | B | C | C | C |

The evaluation results shown in Table 1 reveal that the present Examples are not only capable of trapping small dirt such as hair, but are also capable of trapping relatively large dirt such as bread crumbs. In contrast, since Comparative Example 1 is formed such that the sheet-joining section 21 and fiber-joining section 32 are provided as a straight line on substantially the same position and thus the long-fiber bundle 3 is restrained by the sheet-joining section 21, there is a drop in the bread crumb trapping capabilities. In Comparative Example 2, the intervals between adjacent sheet-joining sections 21 are too small, and thus the degree of freedom of the long fibers 31 constituting the long-fiber bundle 3 is limited by the sheet-joining sections 21. This results in a drop in the bread crumb trapping capabilities. In Comparative Example 3, the intervals between adjacent sheet-joining sections 21 are too large, and thus the degree of freedom of the fibers in the fiber bundle becomes too high and the fibers cling together. This results in a drop in the bread crumb trapping capabilities.

Example 4

A cleaning sheet as illustrated in FIG. 9 or 10 was produced. A 2.2-dtex-thick core/sheath heat-fusible conjugate fiber having a polyethylene terephthalate core and a polyethylene sheath was used for the long fibers 31 constituting the long-fiber bundle 3. An opening device was used to open 5 g (about 160,000 pieces of fiber) of fiber bundle (tow) of the conjugate fiber and to widen it to a length of 280 mm and width of 80 mm. To prevent the long fibers 31 from falling apart, the long fibers 31 were joined to the substrate sheet 2 by two fiber-joining sections 32, 32. Each of the two fiber-joining sections 32, 32 was formed as a single continuous straight line spanning the entire length of the substrate sheet 2 in the length direction thereof (i.e., in a direction orthogonal to the orientation direction of the long fibers 31). Each fiber-joining section 32 was 3 mm wide. The spacing between the two adjacent fiber-joining sections 32, 32 was 8 cm. Note that joining of the fiber-joining section 32 was achieved by heat-fusing, and the width direction of the long-fiber bundle 3 matched the orientation direction of the long fibers 31.

An air-through nonwoven fabric having a basis weight of 40 g/m$^2$ was used for the substrate sheet 2. The constituent fiber thereof was a core/sheath heat-fusible conjugate fiber (2.2 dtex×51 mm) having a polyethylene terephthalate core and a polyethylene sheath. The substrate sheet 2 was 285 mm long and 205 mm wide.

The long fibers 31 and the substrate sheet 2 were cut by a plurality of linear cut sections 24 in substantially the central position of the two adjacent fiber-joining sections 32, 32, to obtain the cleaning sheet of Example 4.

The linear cut sections 24 were disposed in a staggered pattern and were formed such that the overlap distance "w" between adjacent linear cut sections 24 was 0.1 mm, the distance "d" between adjacent linear cut sections 24 was 30 mm, and the length "l" of each linear cut section 24 was 40 mm.

Example 5

Example 5 was made just like Example 4, except that the overlap distance "w" between adjacent linear cut sections 24 was changed from that of Example 4. The overlap distance "w" between adjacent linear cut sections 24 in Example 5 was 0.5 mm.

Example 6

As in Example 5, Example 6 was made just like Example 4, except that the overlap distance "w" between adjacent linear cut sections 24 was changed. The overlap distance "w" between adjacent linear cut sections 24 in Example 6 was 2.0 mm.

Example 7

As in Examples 5 and 6, Example 7 was made just like Example 4, except that the overlap distance "w" between adjacent linear cut sections 24 was changed. The overlap distance "w" between adjacent linear cut sections 24 in Example 7 was 0 mm.

Comparative Example 4

Comparative Example 4 was different from Example 4 in that the long fibers 31 and the substrate sheet 2 were not cut. The other features were the same as in Example 4.

Comparative Example 5

Comparative Example 5 was different from Example 4 in that the long fibers 31 and the substrate sheet 2 were not cut by a plurality of linear cut sections 24 arranged in a staggered pattern, but the long fibers 31 and the substrate sheet 2 were cut by a single continuous straight cutting line. The other features were the same as in Example 4.

Comparative Example 6

Comparative Example 6 was different from Example 4 in that the long fibers 31 and the substrate sheet 2 were not cut by a plurality of linear cut sections 24 arranged in a staggered pattern, but the long fibers 31 were cut by a single continuous straight cutting line. Also, the substrate sheet 2 was not cut, and only the long fibers 31 were cut by a plurality of linear cut sections 24. The other features were the same as in Example 4.

Dirt Trapping Capabilities:

Each cleaning sheet according to the Examples and Comparative Examples was attached to the cleaning tool 4 illustrated in FIG. 13 and was used to sweep an eight-tatami-mat-sized wooden-floored room scattered with strands of hair and lint, to evaluate its dirt trapping capabilities. The evaluation criteria were as follows:

A: All the dirt was completely trapped
B: The dirt was mostly trapped, although a small amount remained
C: Some portions of the dirt remained without being trapped
F: Almost half of the dirt remained without being trapped Resistance of Long Fibers to Getting Caught:

The resistance of the cleaning sheet's long fibers to getting caught in an object-being-cleaned was evaluated at the time of sweeping according to the procedure described in "Dirt Trapping Capabilities" above. The evaluation criteria were as follows:

A: Did not get caught at all
B: Rarely got caught
C: Sometimes got caught
F: Always got caught Production of Litter from Cut Long Fibers:

The production of litter from the long fibers at the time of producing each cleaning sheet according to the Examples and Comparative Examples was evaluated. The evaluation criteria were as follows:

A: Produced no litter at all
B: Produced only an extremely small amount of litter
C: Produced a small amount of litter
F: Produced a large amount of litter Ease of Producing Cleaning Sheet:

The ease of producing each cleaning sheet according to the Examples and Comparative Examples was evaluated. The evaluation criteria were as follows:

A: Very easy to produce
B: Easy to produce
C: Difficult to produce
F: Very difficult to produce Evaluation results for the Examples and Comparative Examples are shown in Table 2 below:

TABLE 2

|  | Example 4 | Example 5 | Example 6 | Example 7 | Comp. Example 4 | Comp. Example 5 | Comp. Example 6 |
| --- | --- | --- | --- | --- | --- | --- | --- |
| Dirt Trapping Capabilities | A | A | A | A | F | F | B |
| Resistance of Long Fibers to Getting Caught | A | A | A | B | F | F | A |
| Production of Litter from Cut Long Fibers | A | B | C | A | A | F | A |
| Ease of Producing Cleaning Sheet | A | A | A | A | A | F | F |

The evaluation results for the Examples and Comparative Examples reveal the following, for example.

The cleaning sheets of the present Examples 4 to 7 exhibited excellent results in almost all the items evaluated, except that the cleaning sheet of Example 6 produced a small amount of litter from the cut long fibers because the overlap distance between adjacent linear cut sections 24 was large.

The cleaning sheet of Comparative Example 4 exhibited poor dirt trapping capabilities and its long fibers 31 were prone to get caught in the object-being-cleaned, because the long fibers 31 between the two adjacent fiber-joining sections were not cut and thus the degree of freedom of the long fibers 31 was limited. The cleaning sheet of Comparative Example 5 could not be evaluated as a cleaning sheet, because not only the long fibers 31 between the two adjacent fiber-joining sections, but also the substrate sheet 2 was cut by a continuous straight cutting line. The cleaning sheet of Comparative Example 6 had poor dirt trapping capabilities—the function of a cleaning sheet which should receive highest priority— compared to the cleaning sheets of Examples 4 to 7, and was also very difficult to produce because only the long fibers 31 between the two adjacent fiber-joining sections were to be cut by a continuous straight cutting line, without cutting the substrate sheet 2.

INDUSTRIAL APPLICABILITY

According to the cleaning sheet of the present invention, the degree of freedom of long-fiber bundles is not limited by the joining sections that join the heat-fusible long fibers to the heat-fusible sheet, and thus the degree of freedom of the heat-fusible long fibers can be increased and dirt trapping capabilities can be improved. Further, according to the production process of the present invention, such a cleaning sheet can be produced with ease.

According to the cleaning sheet of the present invention, the degree of freedom of the heat-fusible long fibers is not limited by the joining sections that join the heat-fusible long fibers to the heat-fusible sheet, and thus the heat-fusible long fibers are less prone to get caught in objects-being-cleaned. Further, the lengths of the heat-fusible long fibers from the melt-bonding section to their tip ends are made random, and thus the dirt trapping capabilities can be improved.

The invention claimed is:

1. A cleaning sheet comprising: a substrate sheet; and a plurality of fiber bundles disposed on at least one side of the substrate sheet and made by aggregating fibers oriented in substantially one direction as an open tow, and the width of each fiber bundle is 2 cm to 30 cm wherein:
   each of the fiber bundles is formed by joining the fibers together with a fiber-joining section extending linearly in a direction orthogonal to the orientation direction of the fibers;
   each of the fiber bundles is joined to the substrate sheet by at least one sheet-joining section;
   the entire fiber-joining section or a plurality of fiber-joining sections is not joined to the substrate sheet;
   the sheet-joining section is disposed on the fiber-joining section in perpendicular contact with the fiber-joining section and orthogonally intersects the fiber-joining section;
   a plurality of the sheet-joining sections is disposed intermittently in a direction intersecting the orientation direction of the fibers;
   a longer axis of the sheet-joining section is oriented parallel to the direction of the fibers.

2. The cleaning sheet according to claim 1, wherein the fiber-joining section is formed as a single continuous straight line or as two parallel discontinuous lines with alternately-disposed discontinuous sections.

3. The cleaning sheet according to claim 1, wherein the fiber-joining section is joined with the sheet-joining section; and
   at least a portion of the fiber-joining section is not joined to the substrate sheet.

4. A process for producing the cleaning sheet according to claim 1, comprising at least:
   a fiber bundle forming step of winding off an aggregate of the fibers oriented in one direction, widening the aggregate to a predetermined width, and joining the fibers together with the fiber-joining section extending in a direction intersecting the orientation direction of the fibers, to form a single-piece fiber bundle;
   a fiber bundle supplying step of supplying the fiber bundle in the same direction as the orientation direction of the fibers onto at least one side of a continuous substrate sheet;
   a laminated structure forming step of joining the fiber bundle and the substrate sheet by the sheet-joining section, to form a laminated structure; and
   a cleaning sheet forming step of cutting the laminated structure into a predetermined length, to form individual cleaning sheets.

5. The process for producing the cleaning sheet according to claim 4, comprising:
   a fiber bundle cutting step of cutting the single-piece fiber bundle into a predetermined length; and
   a fiber bundle supplying step of supplying, in the same direction as the orientation direction of the fibers, the fiber bundle that has been cut into the predetermined length onto at least one side of the continuous substrate sheet.

* * * * *